United States Patent [19]

Penkar et al.

[11] Patent Number: 4,773,025

[45] Date of Patent: Sep. 20, 1988

[54] MULTIAXIS ROBOT CONTROL HAVING CURVE FITTED PATH CONTROL

[75] Inventors: Rajan C. Penkar, Woodbury; Timothy P. Skewis, Roxbury, both of Conn.

[73] Assignee: Unimation, Inc., Danbury, Conn.

[21] Appl. No.: 932,840

[22] Filed: Nov. 20, 1986

[51] Int. Cl.$^4$ ............................................. G06F 15/46
[52] U.S. Cl. ..................................... 364/513; 318/568; 364/174; 901/2; 901/9
[58] Field of Search ......................... 364/513, 191–193, 364/174; 318/561, 568; 901/2–5, 9, 23, 24, 41, 46; 414/730

[56] References Cited

U.S. PATENT DOCUMENTS

| | | | |
|---|---|---|---|
| 4,362,978 | 12/1982 | Pollard et al. | 364/513 X |
| 4,506,321 | 3/1985 | Comstock et al. | 364/174 |
| 4,535,405 | 8/1985 | Hill et al. | 364/400 |
| 4,598,380 | 7/1986 | Holmes et al. | 364/513 |
| 4,603,284 | 7/1986 | Perzley | 364/513 |
| 4,623,971 | 11/1986 | Ailman et al. | 364/513 |

*Primary Examiner*—Joseph Ruggiero
*Attorney, Agent, or Firm*—J. L. Brzuszek

[57] ABSTRACT

A digital control is provided for a robot having a plurality of arm joints. The control includes an electric motor for driving each of the robot arm joints and a power amplifier supplies drive current to each motor.

Each joint motor has feedback control loop means including at least digital position, velocity and torque control loops operable at a predetermined sampling rate to control the associated power amplifier. Digital motor position, velocity and drive current feedback signals are generated for the control loop means for all of the robot axes.

Paired system microprocessors or paired position/velocity microprocessors generate position commands for the feedback control loop means in accordance with predefined moves set forth in a robot program. A planning program generates a time profile including acceleration, slew and deceleration time segments for each commanded robot program move.

A trajectory program generates position commands for each of the feedback control loop means in accordance with a curved path trajectory and in accordance with the time profile applicable to the current move segment.

The trajectory program employs stored third order polynomial equations and arc equations each having predetermined variable parameters operative to particularize that equation to a commanded curved path segment. The trajectory program responds to parameters specified by the robot program and implements the stored equations corresponding to the specified parameters to generate the position commands and define a tool tip trajectory corresponding to the curved path defined by the robot program.

17 Claims, 22 Drawing Sheets

MULTIAXIS ROBOT CONTROL HAVING CURVE FITTED PATH CONTROL

CROSS REFERENCE TO RELATED APPLICATIONS

The following concurrently filed patent applications, each filed on Nov. 20, 1986 are related to the disclosure of the present application, assigned to the present assignee and are hereby incorporated by reference:

U.S. Ser. No. 932,975 (W.E. Case 53,224) entitled DIGITAL ROBOT CONTROL HAVING AN IMPROVED CURRENT SENSING SYSTEM FOR POWER AMPLIFIERS IN A DIGITAL ROBOT CONTROL and filed by Kenneth E. Daggett, Leonard C. Vercellotti, Richard A. Johnson, Richard J. Casler and Eimei Onaga.

U.S. Ser. No. 932,841 (W.E. Case 53,225) entitled DIGITAL ROBOT CONTROL HAVING AN IMPROVED PULSE WIDTH MODULATOR and filed by Kenneth E. Daggett.

U.S. Ser. No. 932,992 (W.E. Case 53,226) entitled COMMUNICATION INTERFACE FOR MULTI-MICROPROCESSOR SERVO CONTROL IN A MULTI-AXIS ROBOT CONTROL SYSTEM and filed by Kenneth E. Daggett.

U.S. Ser. No. 932,976 (W.E. Case 53,227) entitled DIGITAL ROBOT CONTROL HAVING HIGH PERFORMANCE SERVO CONTROL SYSTEM and filed by Kenneth E. Daggett, Richard J. Casler and Eimei Onaga.

U.S. Ser. No. 932,974 (W.E. Case 53,367) entitled DIGITAL ROBOT CONTROL PROVIDING PULSE WIDTH MODULATION FOR A BRUSHLESS DC DRIVE and filed by Kenneth E. Daggett, Richard A. Johnson, Eimei Onaga and Richard J. Casler.

U.S. Ser. No. 932,853 (W.E. Case 53,368) entitled IMPROVED POSITION AND VELOCITY FEEDBACK SYSTEM FOR A DIGITAL ROBOT CONTROL and filed by Kenneth E. Daggett, Richard J. Casler and Eimei Onaga.

U.S. Ser. No. 932,982 (W.E. Case 53,369) entitled UNIVERSAL ROBOT CONTROL BOARD CONFIGURATION and filed by Richard J. Casler, Eimei Onaga, Vincent P. Jalbert, Barrett Booth, and Kenneth E. Daggett.

U.S. Ser. No. 932,991 (W.E. Case 53,372) entitled BASIC DIGITAL MULTIAXIS ROBOT CONTROL HAVING PERFORMANCE EXPANSION CAPABILITY and filed by Kenneth E. Daggett, Barrett Booth, Eimei Onaga and Richard J. Casler.

U.S. Ser. No. 932,989 (W.E. Case 53,373) entitled IMPROVED DIGITAL CONTROL FOR MULTIAXIS ROBOTS and filed by Kenneth E. Daggett, Richard J. Casler, Eimei Onaga, Barrett Booth, Rajan Penkar, Leonard C. Vercellotti and Richard A. Johnson.

U.S. Ser. No. 932,983 (W.E. Case 53,374) entitled MODULAR ROBOT CONTROL SYSTEM and filed by Kenneth E. Daggett, Barrett Booth, Vincent P. Jalbert, Eimei Onaga and Richard J. Casler.

U.S. Ser. No. 932,977 (W.E. Case 53,423) entitled MULTIPROCESSOR TORQUE SERVO CONTROL FOR MULTIAXIS DIGITAL ROBOT CONTROL SYSTEM and filed by Kenneth E. Daggett, Richard J. Casler and Eimei Onaga.

U.S. Ser. No. 932,990 (W.E. Case 53,424) entitled MULTIPROCESSOR POSITION/VELOCITY SERVO CONTROL FOR MULTIAXIS DIGITAL ROBOT CONTROL SYSTEM and filed by R. Lancraft, Eimei Onaga, Richard J. Casler, Kenneth E. Daggett and Barrett Booth.

U.S. Ser. No. 932,986 (W.E. Case 53,489) entitled MULTIAXIS ROBOT HAVING IMPROVED MOTION CONTROL THROUGH VARIABLE ACCELERATION/DECELERATION PROFILING and filed by Rajan Penkar and Neil Tan.

U.S. Ser. No. 932,988 (W.E. Case 53,490) entitled MULTIAXIS ROBOT CONTROL HAVING CAPABILITY FOR EXECUTING TIMED MOVES and filed by Rajan Penkar.

U.S. Ser. No. 932,985 (W.E. Case 53,491) entitled MULTIAXIS ROBOT CONTROL HAVING IMPROVED CONTINUOUS PATH OPERATION and filed by Rajan Penkar. U.S. Ser. No. 932,973 (W.E. Case 53,493) entitled MULTIAXIS ROBOT CONTROL HAVING IMPROVED ENERGY MONITORING SYSTEM FOR PROTECTING ROBOTS AGAINST JOINT MOTOR OVERLOAD and filed by Eimei Onaga.

U.S. Ser. No. 932,842 (W.E. Case 53,494) entitled MULTIAXIS DIGITAL ROBOT CONTROL HAVING A BACKUP VELOCITY MONITOR AND PROTECTION SYSTEM and filed by Eimei Onaga.

BACKGROUND OF THE INVENTION

The present invention relates to robots and more particularly to robot controls capable of providing curved path control.

In the prior art, robot motion over a curved path has typically been controlled by employing point-to-point programming to approximate the curve with a series of straight line segments and thereafter employing continuous path control for smoothing between path segments. As considered more fully in U.S. Ser. No. 932,985, continuous path control involves executing a smoothing transition between path segments having different slew velocities.

To follow a curved path closely with continuous path control, numerous points to be defined along the path, i.e., extensive programming labor is required. Further, by defining numerous points for the path, the robot tool tip typically cannot reach full speed because of the effects of smoothing. Finally, different robot speeds will result in different tool tip paths since the path is speed dependent.

It is thus desirable to provide robot arms with coordinated joint control that results in tool tip motion directly following a mathematical curve that accurately defines the curved path without the discontinuity effects of the prior art. In other words, it is desirable that mathematical curve fitting techniques be adapted for robot path control. The present invention is directed to this end and its implementation is facilitated by the completely digital robot control disclosed in the incorporated by reference patent applications.

SUMMARY OF THE INVENTION

A digital control is provided for a robot having a plurality of arm joints. The control includes an electric motor for driving each of the robot arm joints and a power amplifier supplies drive current to each motor.

Each joint motor has feedback control loop means including at least digital position, velocity and torque control loops operable at a predetermined sampling rate to control the associated power amplifier. Digital motor position, velocity and drive current feedback signals are generated for the control loop means for all of the robot axes.

Digital control means generate position commands for the feedback control loop means in accordance with predefined moves set forth in a robot program. It includes planning program means for generating a time profile including acceleration, slew and deceleration time segments for each commanded robot program move. It further includes trajectory program means for generating position commands for each of the feedback control loop means in accordance with a curved path trajectory and in accordance with the time profile applicable to the current move segment.

The trajectory program generating means include stored curve defining equations each having predetermined variable parameters operative to particularize that equation to a commanded curved path segment. The trajectory program generating means responds to parameters specified by the robot program and implements the stored equations corresponding to the specified parameters to generate the position commands and define a tool tip trajectory corresponding to the curved path defined by the robot program.

BRIEF DESCRIPTION OF THE DRAWINGS

FIGS. 7A, 7B-1 and 7B-2 show more detailed flow charts for the system motion software;

FIGS. 10A1-1, 11A1-2 and 12 show respective block diagrams for servo control, torque processor and arm interface boards employed in the system of FIG. 5, FIGS. 13A, 13B and 14 show bridge configurations for DC brushless and brush-type DC joint motors.

DESCRIPTION OF THE PREFERRED EMBODIMENT

ROBOTS—GENERALLY

Robot capabilities generally range from simple repetitive point-to-point motions to complex motions that are computer controlled and sequenced as part of an integrated manufacturing system. In factory applications, robots can perform a wide variety of tasks in various manufacturing applications including: die casting, spot welding, arc welding, investment casting, forging, press working, spray painting, plastic molding, machine tool loading, heat treatment, metal deburring, palletizing, brick manufacturing, glass manufacturing, etc. For more complete consideration of robots and their uses, reference is made to a book entitled "Robotics In Practice" published in 1980 by Joseph F. Engelberger.

To perform work within its sphere of influence, a robot typically is provided with an arm, a wrist subassembly and an end effector. The coordinate system employed for the robot arm typically is Cartesian, cylindrical, polar or revolute. Generally, three motion axes are employed to deliver the wrist subassembly anywhere within the sphere of influence and three additional motion axes are employed for universal orientation of the end effector. A drive system is used for each motion axis, and it may be electrical, hydraulic or pneumatic.

PUMA ROBOT

Figure 1:
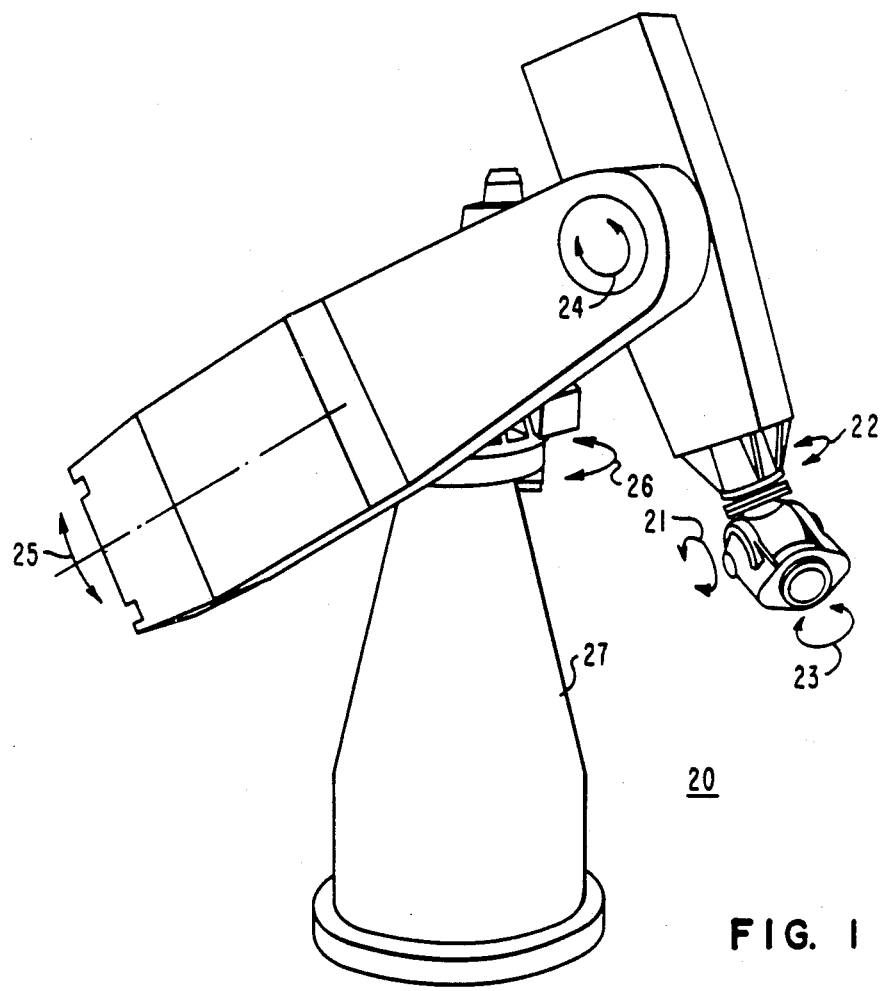
FIG. 1 shows a perspective view of a robot which is operated with more advanced and more accurate performance when controlled by a system making use of the invention.

More particularly, there is shown in FIG. 1 a six-axis industrial electric robot 20 which is illustrative of a wide variety of robots that can be operated in accordance with the principles of the invention. The robot 20 is a relatively powerful electric robot sold by Unimation Company, a wholly-owned company of the present assignee, under the trade name UNIMATE PUMA SERIES 700. The Model 761 PUMA has a 22 pound payload capacity and a reach of 59.1 inches. The Model 762 PUMA has a 44 pound payload capacity and a reach of 49.2 inches.

PUMA 700 Series robots are designed with flexibility and durability to ensure long life and optimum performance in even the harshest, most demanding manufacturing environments. Specific customer needs for either higher payload or extended reach determine which model is suitable for a particular task.

With its longer reach, the PUMA 761 is ideally suited for precise, repetitive tasks such as arc welding and sealant dispensing. The PUMA 762 performs high-precision material handling, machine loading, inspection, testing, joining and assembly in medium and heavier weight applications. The PUMA robots occupy minimal floor space, yet a large work envelope allows the robots to service multiple machines and work surfaces.

Each axis motion is generated by a brush type DC electric motor, with axis position feedback generated by incremental encoders. As shown, the wrist is provided with three articulations, i.e., an up/down rotation indicated by arrow 21 and a left/right rotation indicated by arrow 22 and a third motion indicated by arrow 23. Elbow and shoulder rotations in the up/down direction are respectively indicated by arrows 24 and 25. Finally, a left/right arm rotation on a base 27 is indicated by arrow 26.

ROBOT CONTROL

The present invention is directed to a robot control 30 (FIGS. 2, 3, or 4) which can operate the robot 20 of FIG. 1 and other robots including the larger Unimation 860 robot which employs brushless DC axis motors and absolute position feedback. Generally, however, the robot control 30 is universally and flexibly applicable to differing kinds and sizes of robots in stand alone or robotic network operation.

As a result of its universality, the control 30 can be arranged to operate a complete family of robots. Thus, all hydraulically and electrically driven robot arms manufactured by Unimation, a company of Westinghouse, assignee of the present invention, can be operated by the control 30. The key to the family usage, or more generally the universality of the control 30 lies in modularization and in minimizing the use of arm dependent hardware and avoiding the use of any arm dependent hardware in as much of the modular control structure as possible. The robot control 30 is identified by the acronym UNIVAL and operates with completely digital servo control to provide better robot performance with lower cost.

CONTROL LOOPS

Figure 2:
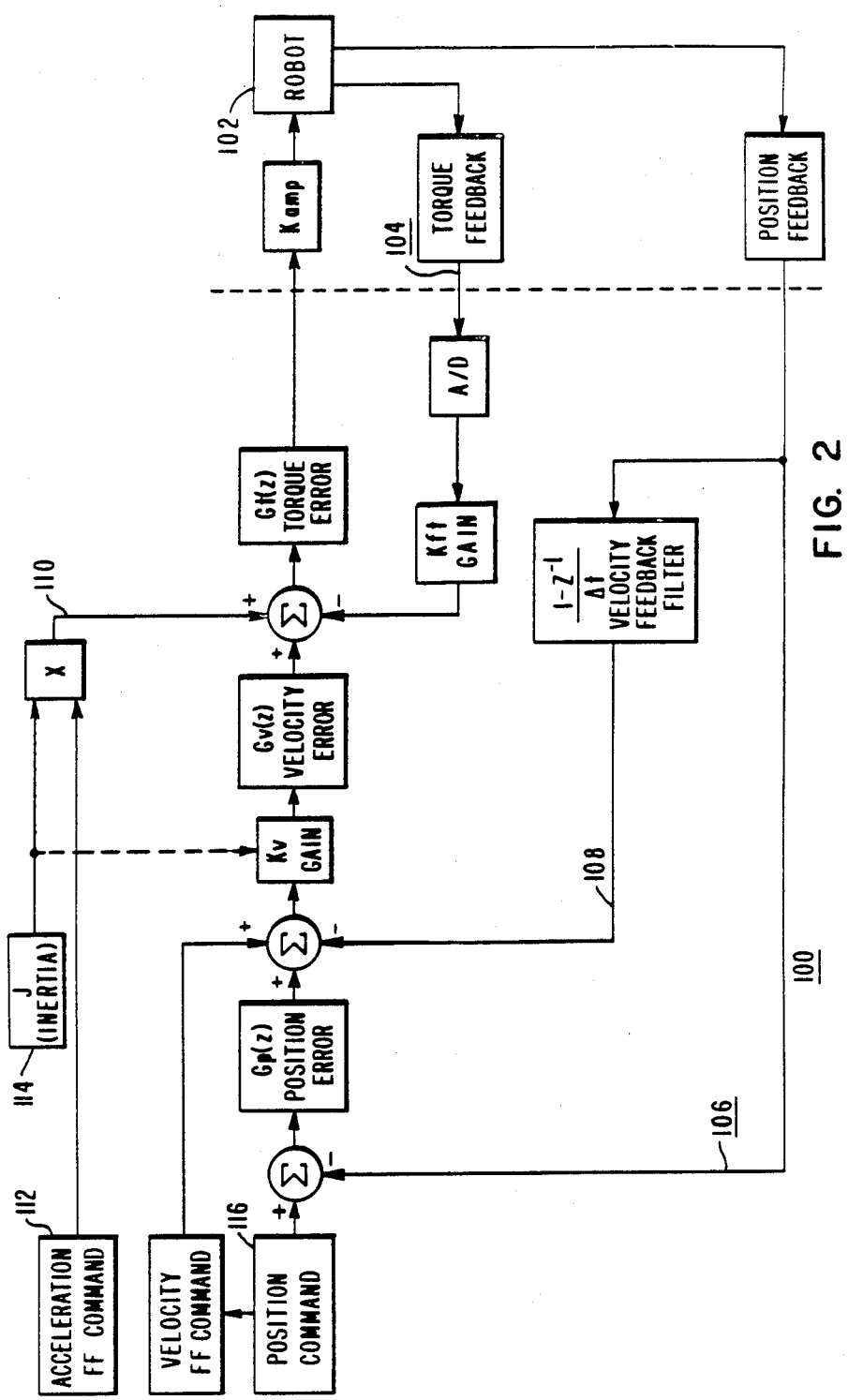
FIG. 2 shows a generalized block diagram of a control loop arrangement employing position, velocity and torque control loops in which the invention may be embodied.

In FIG. 2, there is shown an embodiment of a generalized control loop configuration 100 employable in the UNIVAL TM robot control. Thus, each robot arm joint motor 102 is operated by a torque control loop 104. An outer position control loop 106 is tandem connected to a velocity control loop 108 which in turn drives the torque control loop 104. A feedforward acceleration control loop 110 is responsive to acceleration command 112 and arm and load inertia 114 is also directly coupled to the input of the torque control loop 104. The robot arm is operated by the control loop 100 in accordance with a robot program through a stream of program position commands 116 applied to the position control loop.

Figure 3:
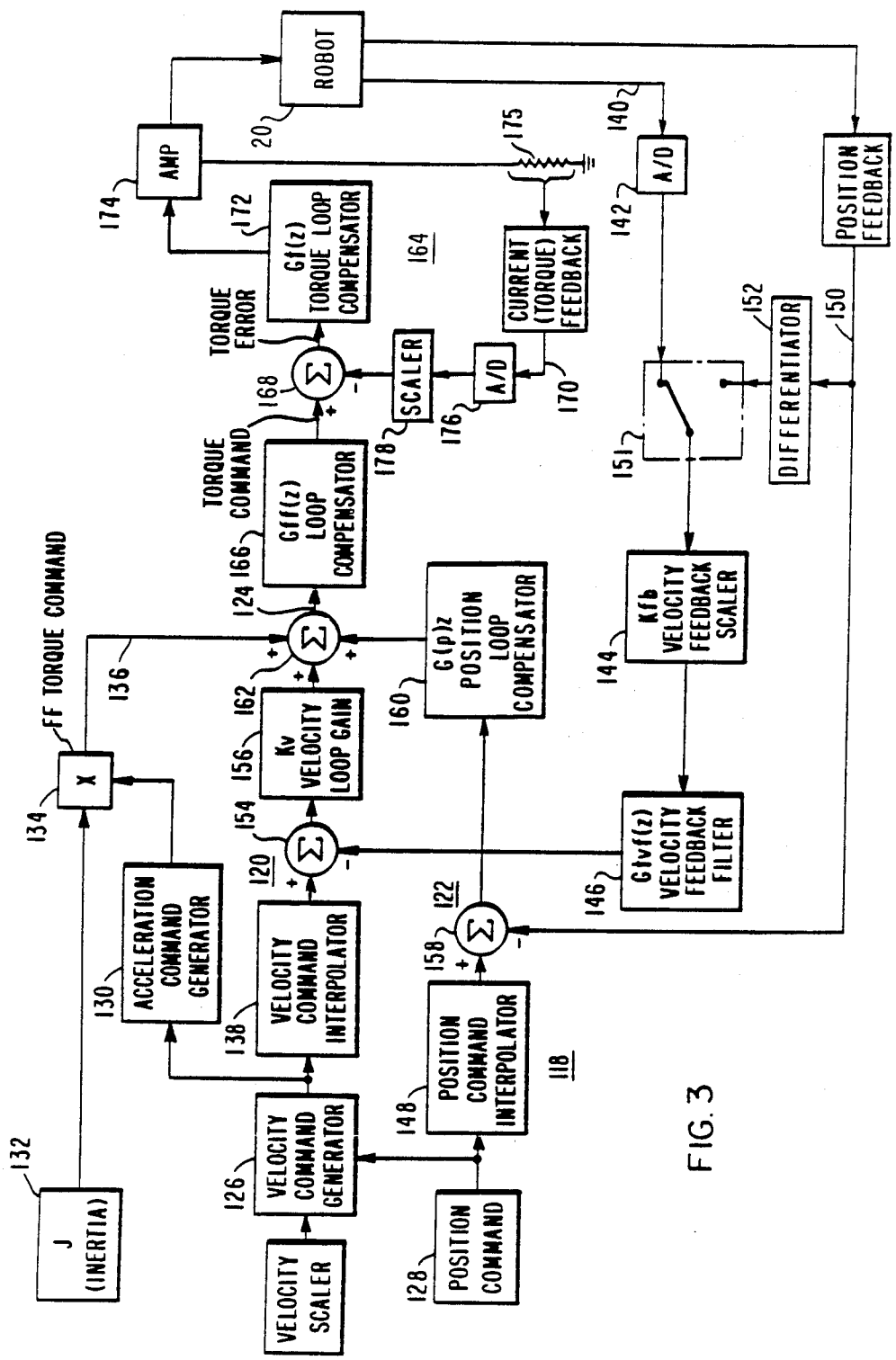
FIG. 3 shows a more detailed block diagram of a control loop arrangement employing position, velocity and torque control loops in which the invention preferably is embodied.

FIG. 3 shows the preferred generalized control loop configuration 118 presently employed in the UNIVAL TM robot control. It is preferably implemented as a completely digital control. With the provision of hierarchical architecture and multiprocessor architecture and floating point hardware as described herein or in other patent applications referenced above, the trajectory cycle can be characterized with a cycle time in the range of 32 to 8 milliseconds depending on the employed modular configuration.

In the preferred control loop arrangement 118, position control loops 122 and velocity control loop 120 are parallel fed to the input of a torque control loop 124. Velocity commands are generated by block 126 from position commands received by block 128. In turn, feedforward acceleration commands are generated by block 130 from the velocity commands. Computed inertia (load and arm) 132 is multiplied against the acceleration command as indicated by reference character 134 in the feedforward acceleration control loop 136.

In the velocity loop 120, the velocity command in the present embodiment is generated once every 8 to 32 milliseconds depending on the modular configuration of the robot control. The basic robot control described subsequently herein has a trajectory cycle time of 32 milliseconds while the enhanced contact has a trajectory cycle of 8 milliseconds.

In any case, a velocity command generator 138 interpolates velocity commands at the rate of 1 each millisecond which corresponds with the velocity feedback sampling rate in velocity feedback path 140. As shown, velocity feedback for a Unimation 860 robot is produced by tachometer signals which are converted from analog to digital by converter 142. A scaler 144 and a filter 146 supplement the velocity feedback circuitry.

Similarly, in the position control loop 122, an interpolator 148 generates position commands every millisecond in correspondence with the position feedback sampling rate in feedback path 150. In the Unimation 860 robot control, position feedback is absolute and the velocity and position feedback paths 140 and 150 operate as just described (with switch 151 as shown). For Unimation PUMA robots, tachometers are not available and velocity feedback is computed from incremental position feedback as indicated by block 152 (with the switch 151 swinging to its other position) as described more fully in referenced applications U.S. Ser. No. 932,841 and U.S. Ser. No. 932,853.

Velocity error is generated by summer 154 with gain applied by loop 156. Similarly, position error is generated by summer 158 with gain applied by box 160.

Velocity and position errors and feedforward acceleration command are summed in summer 162. Gain is applied in box 166 to generate a torque command which is applied to the input of torque control loop 164 every millisecond. Torque error is generated in summer 168 by summing the torque command (motor current command) with current feedback from feedback path 170. Box 172 applies a torque loop gain to the torque error and pulse width modulated (PWM) output commands (motor voltage commands) are applied to a power amplifier 174 which supplies the motor drive current for robot joint operation. Current feedback from resistor 175 is generated every 250 microseconds (see referenced patent application U.S. Ser. No. 932,975) and converted to digital signals by box 176 with scaling applied by box 178.

OVERVIEW—ELECTRONIC BOARDS

Figure 4:
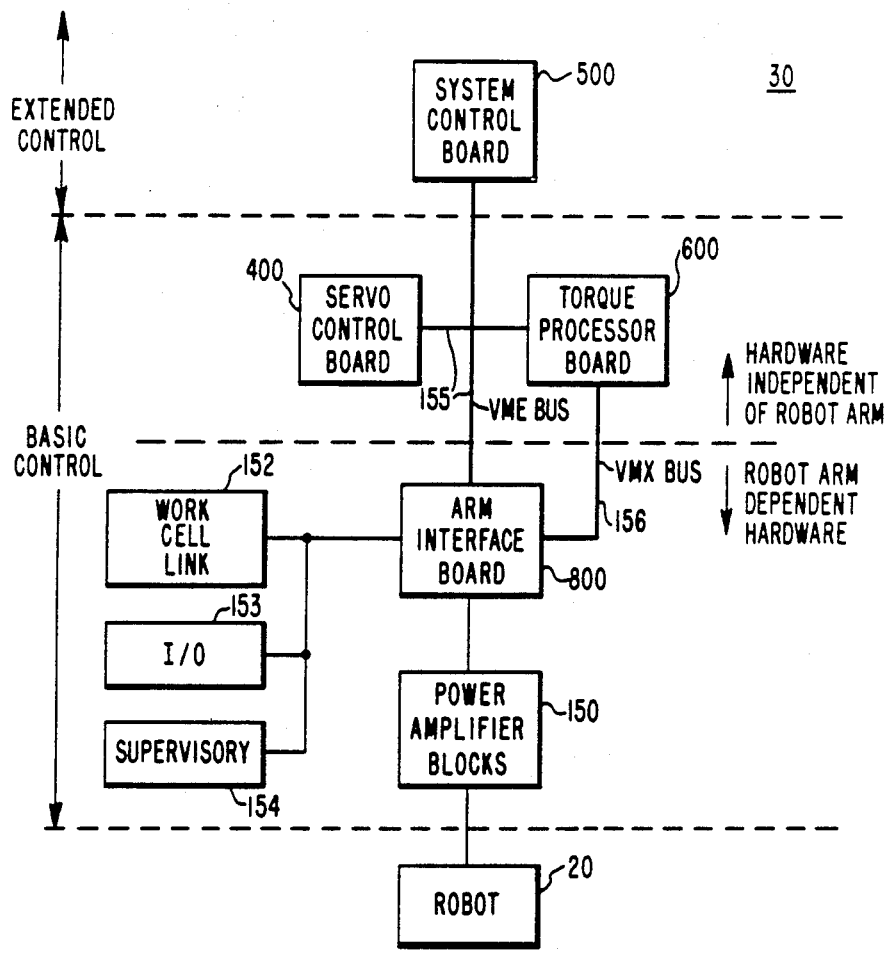
FIG. 4 shows an overview of an arrangement of electronic boards on which circuitry is arranged to implement the robot control system including the curved path control feature of the present invention.

Implementation of the control looping for the robot control 30 in FIG. 4 is achieved by the use of digital control circuitry disposed on a plurality of electronic boards. The organization of the circuitry on the boards and the partitioning of programming among various microprocessors enables advanced robot control performance to be achieved with a modular control configuration characterized with economy of manufacture, facilitates variability of configuration which enables universality of use, and flexibility in choice of level of control performance.

As shown in FIG. 4, the control board configuration includes an arm interface board 800 which preferably houses all circuitry dependent on the type of robot arm being controlled. For example, position feedback circuitry will differ according to whether absolute or incremental position feedback is used by the robot arm to be controlled. Thus, two or possibly more varieties of the arm interface board 800 can be employed to provide digital control systems for any of a variety of different sizes or types of robot arms. Any particular robot arm would require use of the arm interface board which is structured to work with that robot arm.

The arm interface (AIF) board 800 also houses generic circuitry such as VME bus control circuitry which is generally related to two or more boards and not to any one board in particular.

Control signals (pulse width modulated) are generated from the AIF board 800 to control power amplifier blocks 150 which supply motor currents to the robot joint motors. The AIF board 800 also operates as a channel for external coupling of the robot control 30 to other robot controls in a work cell as indicated by the reference character 152, to programmable controllers and other input/output devices 153 in an area network and to higher level computers 154 for supervisory control.

A torque processor (TP) board 600 and a servo control board 400 are generic circuit boards used with the AIF board 800 and power amplifier blocks 150 in all robot control systems for all robot types. The three circuit boards 400, 600 and 800 provide complete 6 axis control for a robot arm and thus form a basic control configuration for the UNIVAL family of robot controls as well as other robot controls.

The torque processor board 600 provides motor torque control in response to commands from the servo control board 400. In turn, the servo control board 400 provides arm solutions and position and velocity control in accordance with a robot control program.

Extended control capability and/or system functioning is achieved by interconnecting additional electronic boards or devices to the basic control 400, 600, 800. For example, with the addition of a system control board 500 and partitioning of predetermined program functions including the arm solutions from the servo control board 400 to the system control board 500, the UNIVAL control can operate the robot 20 and other robots with significantly faster control action, i.e., with a trajectory cycle shortened from thirty-two milliseconds to eight milliseconds.

Interboard data communications for control and other purposes occur over multiple signal paths in a VME bus 155. Additionally, a VMX bus 156 is provided for connection between the torque processor board 600 and the AIF board 800.

Multiple pin interconnectors (not shown in FIG. 4) are provided on the AIF, TP and SCM boards and any other connectable units to facilitate VME and VMX interboard bus connections modular and board assembly for the robot control 30. Other connectors are provided on the AIF board 800 for external input/output connections.

More detail on the board circuit structure is presented herein or elsewhere in the writeups for the cross-referenced patent applications.

SYSTEM FOR IMPLEMENTING CURVE FITTED PATH CONTROL FOR MULTIAXIS ROBOTS

Figure 5:
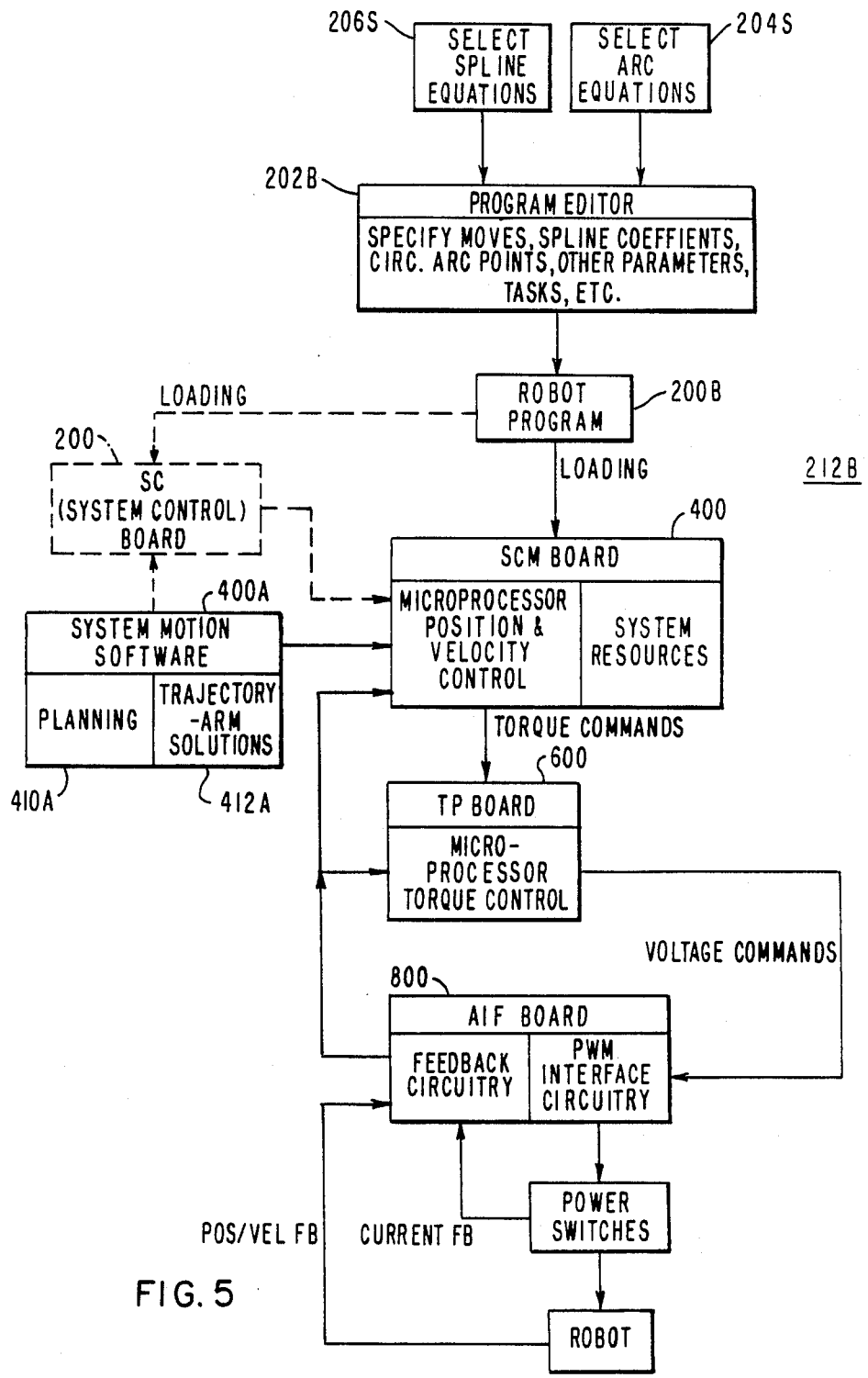
FIG. 5 shows a block diagram of a robot control system employed to implement curved path control in accordance with the invention.

As shown in FIG. 5, a program editor 202B is employed to produce a robot program 200B for implementation by the robot control. In the editing process, the robot moves, parameters, tasks, etc. are specified as indicated in block 202B.

The program editor 202B further includes a capability for specifying curved paths employing curve fitting techniques.

Generally, any path can be mathematically defined by a combination of circular arc equations and spline equations. Thus, as indicated by blocks 204S and 206S the programmer first determines the combination of arc and spline equations needed to produce robot tool tip movement over the desired curved path. In the preferred embodiment, the robot control executes commands based on spline functions up to and including third order polynomials.

Some applications may require use of higher order polynomials to produce the smoothness needed by the robot user. Other embodiments of the invention can employ higher order polynomials so long as the computing speed is high enough to enable the use of the higher order polynomials.

After specification of the equations, the programmer determines three arc points for each arc equation and the coefficients for each spline equation. These equation parameters are entered into the program editor 202B and reflected in the resultant robot program 200B.

The robot control includes a system 212B for implementing path control as the robot program is executed. The system 212B includes various elements of the robot control and particularly various elements of the electronic SC or SCM, TP and AIF control boards.

With the basic robot control configuration, the robot program is loaded into memory on the SCM board 400. System motion software 400A, including a path planning program 410A and a trajectory interpolation program 412A, is also stored on the SCM board 400 to respond to the robot program and plan and interpolate the actual robot motion so as to apply path control in implementing the path defining equation parameters selected for the robot program.

In an expanded performance robot control configuration indicated by dotted lines in FIG. 5 (reference is made to U.S. Ser. No. 932,991 for a fuller description of the expanded control), a system control board 200 receives the robot program and includes microprocessor circuitry for executing the system motion software. The system control board 200 generates position commands for application to the position/velocity control on the SCM board 400.

Generally, in the basic control, the SCM board 400 includes a microprocessor called a servo control manager, that operates in conjunction with a calculator coprocessor to execute the system motion software and generate position commands for all of the robot axes. In turn, the position and velocity control looping on the SCM board, including the servo control manager and a servo calculator, operates on the position commands to generate torque commands for the TP board 600.

Torque control circuitry on the TP board 600 generates voltage commands which are applied to a pulse width modulator (PWM) on the AIF board 800. The PWM in turn operates the power switches for the various joint motors to move the joints coordinately so that the robot tool tip goes through the commanded motion in accordance with the selected path defining equation parameters. Feedback is provided through the AIF board 800 for the control looping as indicated.

MOTION SOFTWARE AT THE SYSTEM LEVEL

Robot position commands are generated by motion software at the system level. In the basic robot control, system motion software is resident on the SCM board 400.

Figure 6:
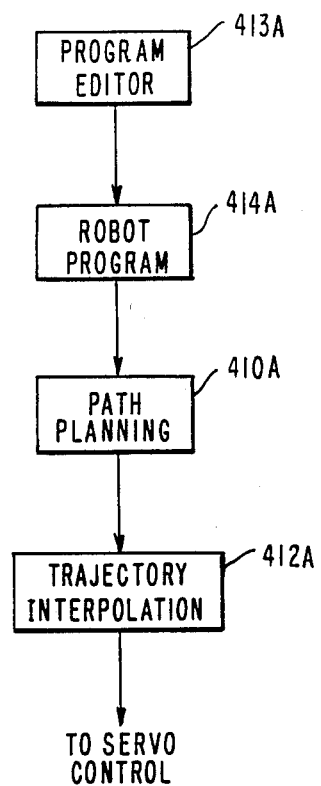
FIG. 6 shows an overview of motion software employed in the robot control of FIG. 5.

As shown in FIG. 6, the motion system software includes a path planning program 410A and a trajectory interpolation program 412A. A robot program 414A prepared by the user, in this case preferably with use of a program editor with the present assignee manufacturer's programming language called VAL, specifies the robot destination points along its programmed path as well as certain other requests and specifications regarding robot operation. In effect, the planning and trajectory programs operate at the system level to process robot program outputs so as to enable robot controller execution of the robot program.

Thus, where a complicated path has been programmed, the robot program normally includes additional intermediate path points. Additionally, the robot program specifies tool tip speed, acceleration and deceleration as a percentage of maximum, and the type of path control, i.e., continuous or point-to-point.

The planning and trajectory programs can be installed on internal UNIVAL board memory, preferably EPROM, or it may be loaded when placed in use into general board memory from floppy disk or other storage means. The user robot program is loaded into UNIVAL board memory at the time of use.

In the case of the basic UNIVAL robot control, system motion software is resident on the SCM board 400. In expanded versions of the UNIVAL robot control, the system motion software is resident on the system control board. Of course, other variations are possible.

The planning program 410A runs on a demand basis, i.e., when a new destination point is received from the robot program. The trajectory program 412A runs cyclically at the system cycle rate, i.e., at the rate of once each 32 or 16 or 8 milliseconds in the preferred embodiment depending on the configuration of the UNIVAL robot control system as explained elsewhere herein or in the referenced patent applications.

1. PLANNING PROGRAM

Basically, planning is performed by the robot control to define how the robot tool tip is to move from its present position to its commanded destination. Thus, the planning program generates a time profile for acceleration, slew and deceleration for successive segments of motion defined by the robot program.

Figure 7A:
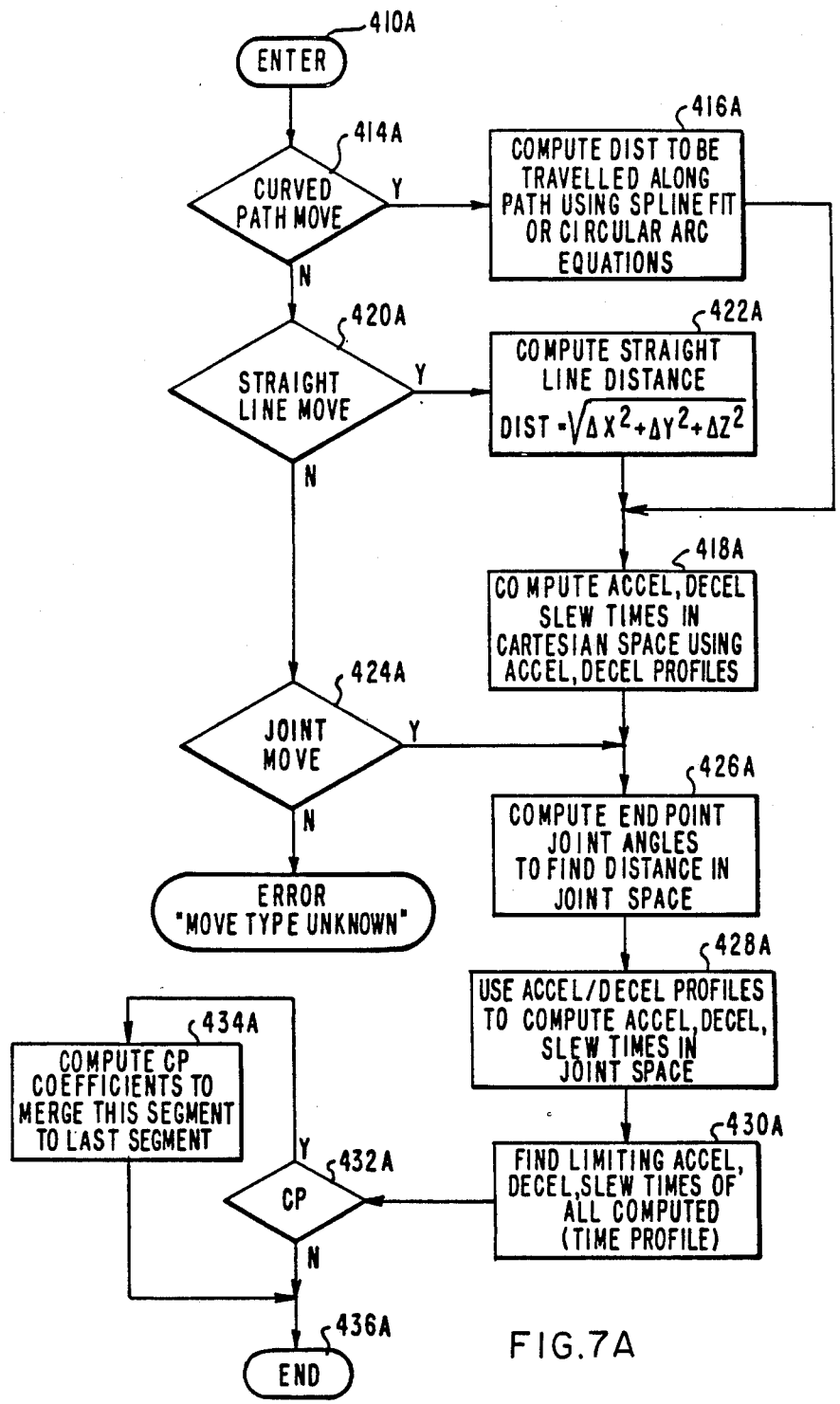

As shown in FIG. 7A, the planning program 410A determines the type of move to be made for each segment and then computes the segment time profile in accordance with the type of move.

Thus, block 414A determines whether a Cartesian move in the form of a curved path has been specified. If so, box 416A computes the distance to be traveled along the path using spline fit equations (up to third order polynomials in the present embodiment) and/or circular arc equations. Block 418A then computes the acceleration, slew and deceleration times for the tool tip in Cartesian space making use of selected acceleration and deceleration profiles (squarewave, sinusoidal wave in the present embodiment or table of values or other profiles in other embodiments).

Generally, the software architecture of the present embodiment has flexibility to accommodate a wide variety of acceleration/deceleration profiles according to a user's needs.

The following equations are used to compute the times Ta, Ts and Td:
Calculation of $t_a$, $t_s$, $t_d$ for normal Cartesian move:

$$t_a = \frac{\text{velocity factor * max velocity}}{\text{accel\_factor * accel\_max}}$$

$$t_d = \frac{\text{velocity factor * velocity max}}{\text{decel\_factor * decel\_max}}$$

User specified through UNIVAL:

velocity_factor=0-1 normalized scaling to max_velocity:
accel_factor=0-1 normalized scaling to max_accel.

Reference is made to Ser. No. 932,986 for more disclosure on the planning feature that employs acceleration/deceleration profile selection.

If a curved path move has not been directed, block 420A detects whether a Cartesian move in the form of a straight line is specified. In a straight line move, the tip of the tool moves along a straight line in Cartesian space and thus moves across the shortest distance between its present location and the destination location. A straight line move may not be the fastest move between two points since a joint move may be faster. The nature of the user application determines whether and when straight line moves are needed.

As in the case of a curved path move, the distance to be traveled in Cartesian space is computed when a straight line move has been directed. Thus, block 422A computes the straight line distance with use of the indicated formula.

A joint move is employed when the user wants the tool tip to be moved from one point to another in the shortest time. However, joint moves are avoided if obstacles exist in the field of possible motion. In a joint move, all of the joints are moved in coordination to produce the farthest tool tip move regardless of the path of the tool tip.

Box 424A determines whether a joint move is to be executed. If so, block 426A computes the endpoint joint angles for all axes for the joint move. Next, the joint distance is computed in joint space by taking the difference between the destination and present joint angles for each axis. The joint move for each joint is accordingly established.

Similarly, block 426A computes the joint distances in joint space for curved path and straight line moves. Block 428A then computes the acceleration, slew and deceleration times in joint space from the joint distances using the selected acceleration/deceleration profiles, i.e. the time profile for each joint motion is basically determined. This computation is performed as a check on block 418A in the case of Cartesian moves (curved or straight line) since it is possible for individual joint motions to be outside prescribed limits even though the planning tool tip motion is within prescribed limits.

Box 430A accordingly determines what limits apply to joint acceleration, slew and deceleration times to modify the time profiles in accordance with joint limits if necessary. The longest limit time for any particular joint is set as a limit for all the joints, i.e. for the move as a whole. The acceleration/deceleration (torque) and velocity capabilities of the robot being controlled are used in setting time limits.

For more description on a feature of the UNIVAL robot control in which the time for a move is specified by the user (i.e., programmed time move), reference is made to U.S. Ser. No. 932,988.

If box 432A determines that continuous path operation has been directed by the user, box 434A computes the continuous path coefficients to be used for smooth merging of the present motion segment with the upcoming motion segment. In smoothing the transition between the slews of successive motion segments, box 434A essentially eliminates unnecessary deceleration/acceleration in changing from one velocity to another. Reference is made to U.S. Ser. No. 932,985 for more disclosure on the operation of the continuous path feature of the UNIVAL robot control.

Once continuous path smoothing calculations have been completed or if continuous path smoothing has not been required, block 436A ends execution of the planning program.

2. TRAJECTORY PROGRAM

The trajectory program 412A is executed during each system cycle to generate joint position commands for the next system cycle. Generally, the trajectory program 412A computes for each upcoming system cycle the accumulated distance to be traveled for each joint when the upcoming cycle is completed. A factor referred to as "S" is computed in the distance calculation. Thus, S is the accumulated distance (S) as a percentage of the total distance to be traveled in terms of a normalized path length (0–1).

A new set of interpolated endpoints are generated to provide position commands for the robot axes for execution during the upcoming system cycle, i.e. the total user specified segment move is subdivided into cycle moves to be executed in successive system cycles (which may in this case have a length of 32, or 16 or 8 milliseconds).

The new position commands are based on the S calculation and the type of move being performed. In implementing the position commands, the servo control provides further real time interpolation by dividing each system cycle into millisecond intervals during which moves of equal distance are executed for each joint.

Figures 1, 7B:
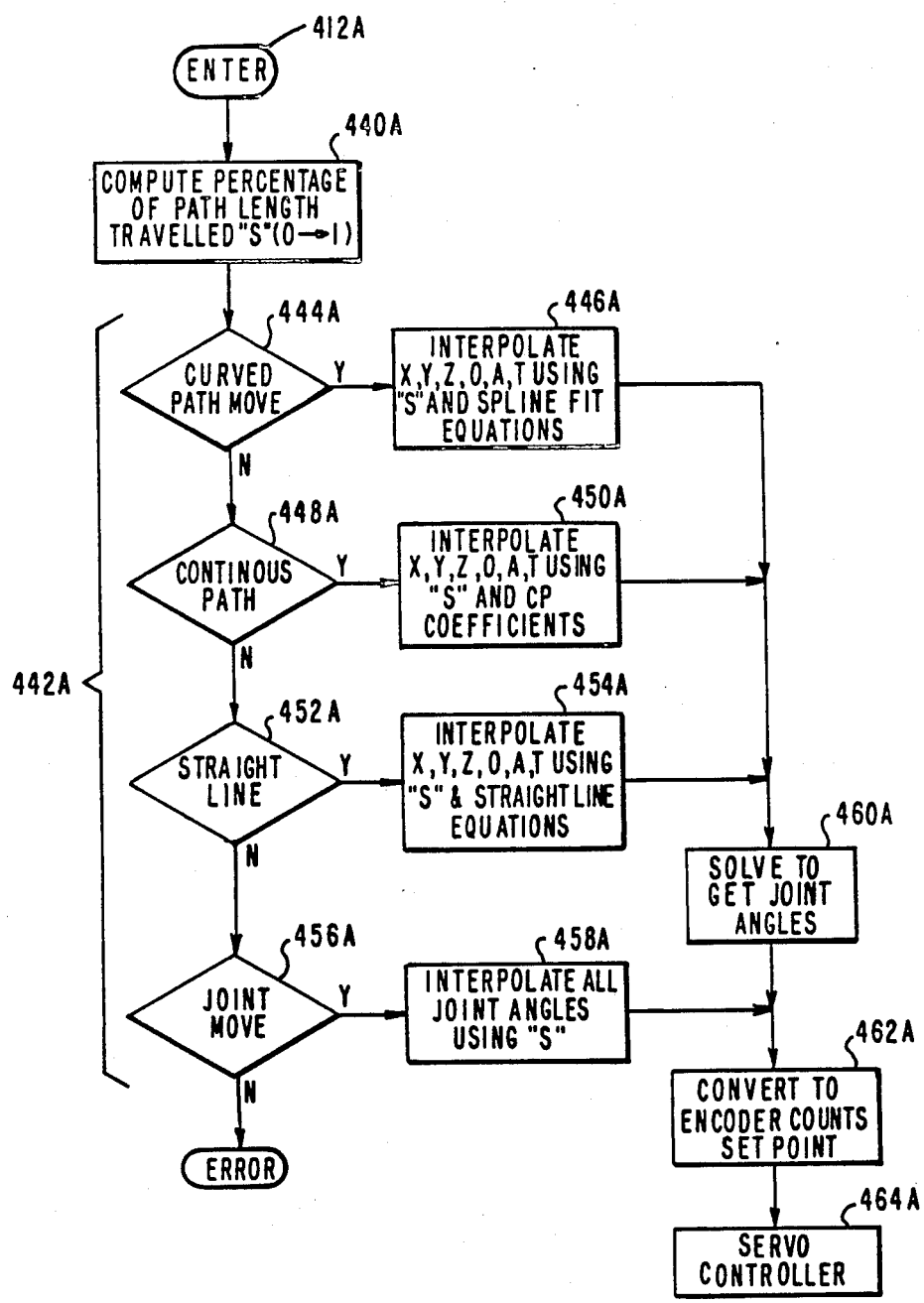
Figures 2, 7B:
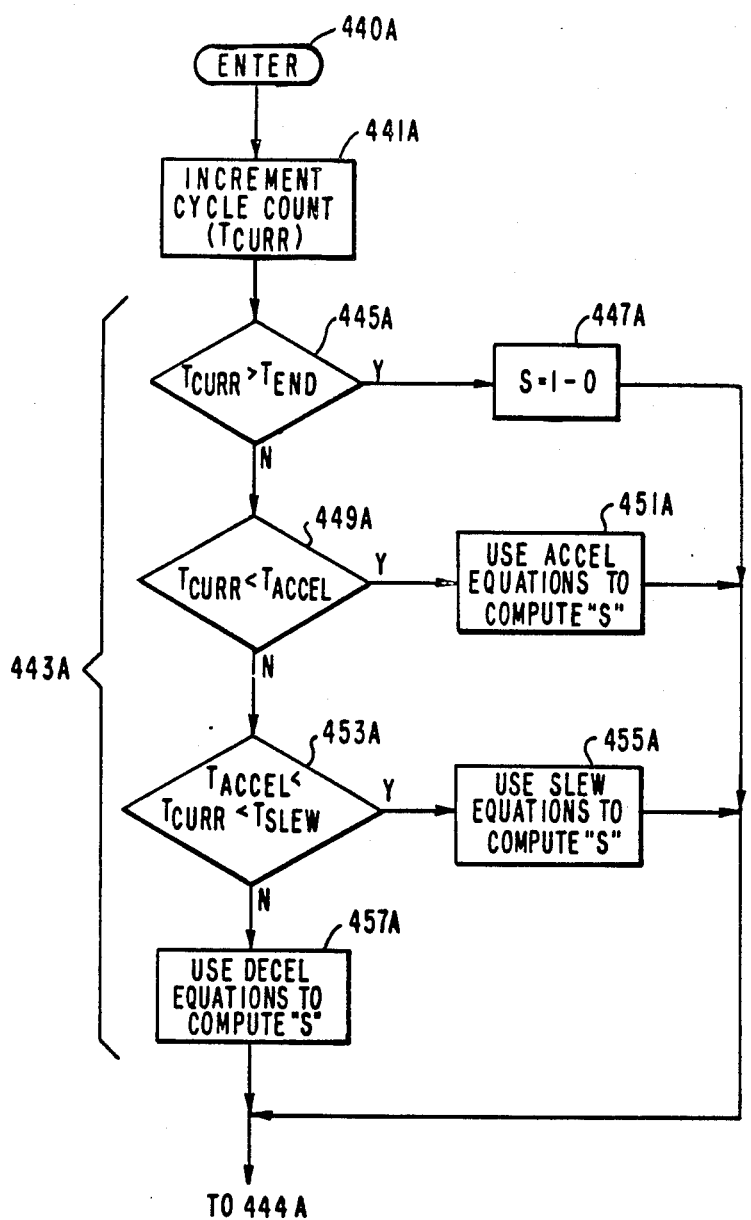

As shown in the flow chart of FIG. 7B-1, block 440A first makes the distance computation for the upcoming system cycle, i.e. S is calculated. In boxes 442A, the type of move is determined and the interpolation calculations for that type move are executed.

Specifically, block 444A determines whether a prescribed path move has been directed, and if so box 446A calculates the Cartesian X, Y, Z, O, A, and T interpolations using the S distance factor, spline fit equations (up to 3rd order polynomials) and circular arc equations. The O, A, and T coordinates represent the orientation of the tool tip in angles.

Generally, in making interpolation calculations for the various types of path moves, the S factor operates as a percentage multiplier in computing for each axis the fraction of the total commanded move to be completed in the upcoming system cycle.

Box 448A determines whether a continuous path move has been directed, and if so box 450A calculates the X, Y, Z, O, A, and T interpolations using the S distance factor and stored continuous path coefficients. The latter are employed in equations that are used to produce smooth transitioning between different slew values in successive path segments. Reference is made to Ser. No. 932,985 where further information is provided on the continuous path mode of operation.

In block 452A, a determination is made as to whether a straight line move has been directed. If so, box 454A makes the interpolation calculations for X, Y, Z, O, A and T using the S distance factor and straight line equations.

If a joint move is detected in box 456A, block 458A makes interpolation calculations for all of the joint angles using the S distance factor. Box 460A converts Cartesian interpolations to joint angles for the case of a prescribed path move, a continuous path move or a straight line move. The conversion to joint angles represents the arm solution and involves knowledge of kinematics of the robot arm, specifically the lengths of the various links and the angles between axes of rotation.

Finally, block 462A converts the interpolated joint angle commands to respective encoder counts operable as a set of position commands applied to the various robot axes by the servo controller 464A. The encoder count conversion reflects the resolution of the encoders, gear ratios and any mechanical coupling between joints (usually only wrist joints are coupled).

The S calculation is shown in greater detail in the flow chart in FIG. 7B-2. Block 441A first increments the system cycle counter. Block 445A then compares the current cycle count to the time profile computed in the planning program for the current path segment. In this manner, the segment portion (acceleration, slew, deceleration) in which the tool tip is currently located is determined.

If box 445A detects that the cycle count exceeds the segment time, S is set equal to 1 by block 447A. If the acceleration segment portion is detected by box 449A, block 451A uses acceleration equations to compute S. Similarly, if block 453A detects the slew segment portion, box 455A uses slew equations to compute S.

Block 457A employs deceleration equations to compute S if the acceleration, slew and segment terminated blocks 445A, 449A, and 453A are negated. The S calculation routine is then completed and trajectory program execution returns to block 444A.

The equations employed in making the S calculation are as follows:

Acceleration Equations
—square wave $s = t^2/(t_a * (2 * t_s + t_a + t_d))$

Figure 8A:
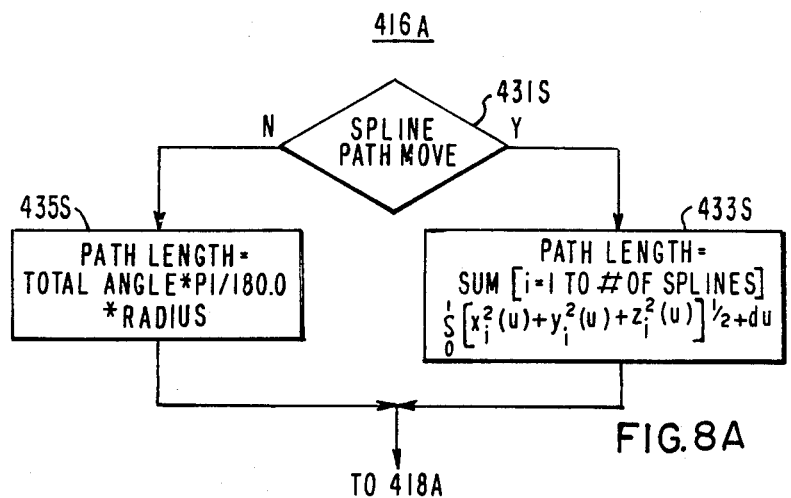
FIGS. 8A and 8B show more detailed programming employed to produce curved path moves in accordance with this invention.
Figure 8B:
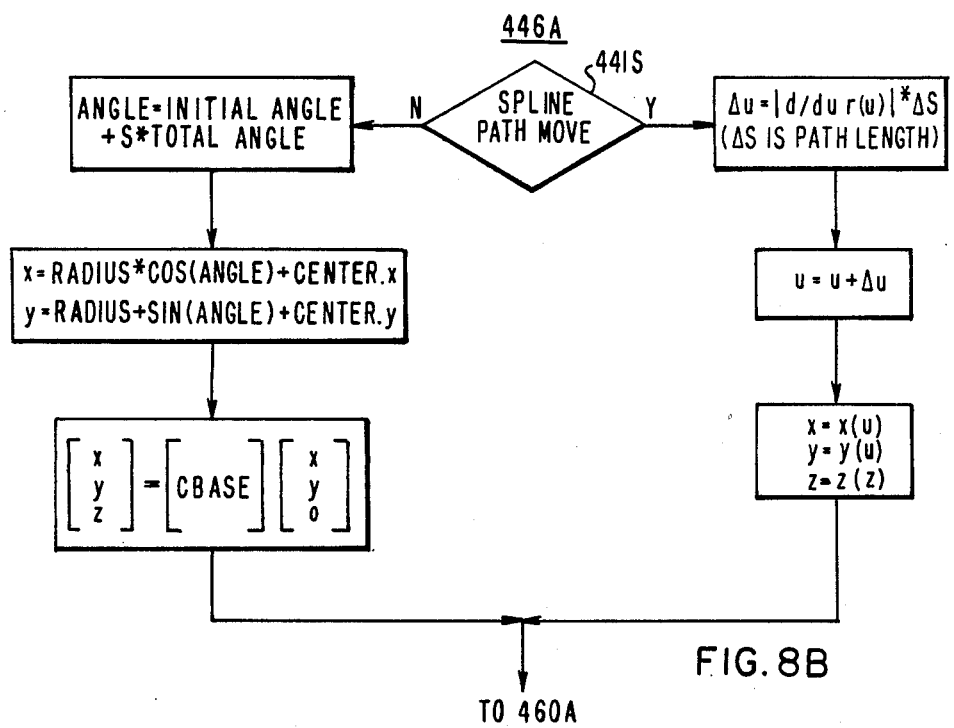

—sinusoidal profile $s = \dfrac{t_a * [(t/t_a) - (\sin(180 * (t_a/t)))/pi]}{[t_a + 2 * t_s + t_d]}$ Deceleration Equations
—square wave $s = $ $((2 * t_s + t_a + t_d) - ((tt - t)**2/t_d))/(2 * t_s + t_a + t_d)$ —sinusoidal profile $s = \dfrac{t + t_s + (t_d/pi) * [\sin(180 * y/t_d)]}{(t_a + 2 * t_s + t_d)}$ where: $y = (t - tt + t_d)$
Slew Equation
$s = (2 * t - t_a)/(2 * t_s + t_a + t_d)$ $t_a$ = acceleration time
$t_d$ = deceleration time
$t_s$ = slew time (constant velocity)
$t$ = current time
$tt = (t_a + t_s + t_d - t)$
$pi = 3.1417$ The programming for curved path moves is shown in greater detail in FIGS. 8A and 8B. Inputs for tool tip orientation and velocity and inputs to the robot program for spline and circular arc moves are as follows:

Spline—polynomial coefficients, spline path section length;

Circular Arc—3 position points, current position (from system).

In the planning program (FIG. 8A), block 416A includes a decision block 431S which determines whether a spline path move is specific. If so, block 433S computes the path length from a polynomial as shown. If not, block 435S makes a circular arc path length computation as shown.

In the trajectory program (FIG. 8B), block 446A includes a decision block 441S to determine whether a spline path move is specified. If so, an incremental distance $\Delta u$ is computed from the calculated $\Delta s$ as shown. The employed equation is correct only at the limit $\Delta s \rightarrow 0$ and it is iteratively employed to converge to the desired incremental distance $\Delta u$. The Cartesian position x, y, z is then computed as a function of $u = u + \Delta u$.

If a circular arc move is specified, the percentage path length "s" is used to compute a new angle as shown. The Cartesian position x, y, z is then computed as a function of new cycle.

CIRCULAR PATH FUNCTIONALITY

Circular Path enables the UNIVAL user to specify a circular path for the robot tool tip to follow. In addition, the orientation of the tool tip is specified and can be related to the actual circular path. "Circular path" means some continuous subset (proper or improper) of a continuous curve of the form:

$$(X - Xc)*(X - Xc) + (Y - Yc)*(Y - Yc) = \text{Radius}*\text{Radius}$$

In this equation, X and Y represent the Cartesian position in the plane of the circle in some reference frame.

The tool tip position is simply interpolated along the specified circular path. However, the tool tip orientation along the circular path has numerous possibilities, one of which is specified by the user. The possibilities are combinations of the following choices:

1. Orientation interpolation vs. Constant orientation. In the former, the orientation is linearly interpolated between two specified orientations. In the latter, the orientation is held constant over the entire circular path.
2. World frame orientation vs. Local frame orientation. In the former, the orientation is with respect to the World reference frame. In the latter, the orientation is with respect to the Local reference frame.
3. Wrap orientation vs. No wrap orientation. In the former, the orientation is, through inaction, allowed to rotate about the a vector. In the latter, the orientation is prevented from rotating about the a vector.

The length of the circular path can be calculated and an "S" profile is fitted to it just as for Cartesian Straight Line motion. Thus, the tool tip can accelerate along the path to a constant velocity and then decelerate to a stop at the end point. Continuous Path can be performed to/from a circular path. The boundary conditions can be calculated at the transition points just as they can for Cartesian Straight Line motion and the same CP algorithm is used.

CIRCULAR PATH OVERVIEW

Planning Data From UNIVAL

The data available for circular path planning is four UNIVAL locations and three orientation switches as follows:

1. Location 1—the starting location for the circular path which is gotten as the planned final location of the previous path segment.
2. Location 2—a point used to define the circle and which is the farther point along the circular path.
3. Location 3—a point used to define the circle and which is the nearer point along the circular path.
4. Location 4—a point used to define the circular path end point. It need not lie on the circle; the intersection between the circle and the line connecting this point with the circle center is the path endpoint.
5. "INT_CON" orientation switch—specifies either Interpolated orientation or Constant initial orientation.
6. "WOR_LOC" orientation switch—specifies either World frame orientation or Local frame orientation.
7. "WRP_NWRP" orientation switch—specifies either Wrap or No wrap orientation.

Figure 9A:
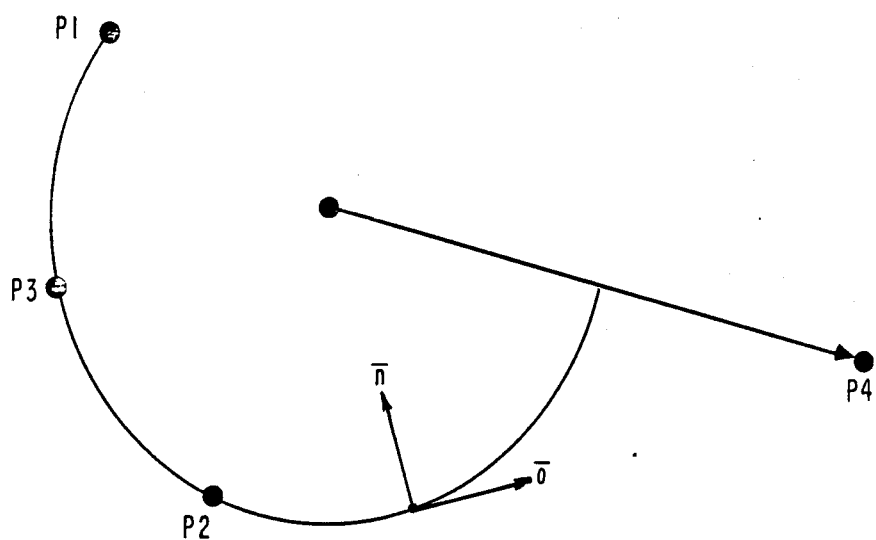
FIGS. 9A-9D show various graphs illustrating curved path operation of the robot control.

A circular path with the designated locations is shown in FIG. 9A.

Figure 9B:
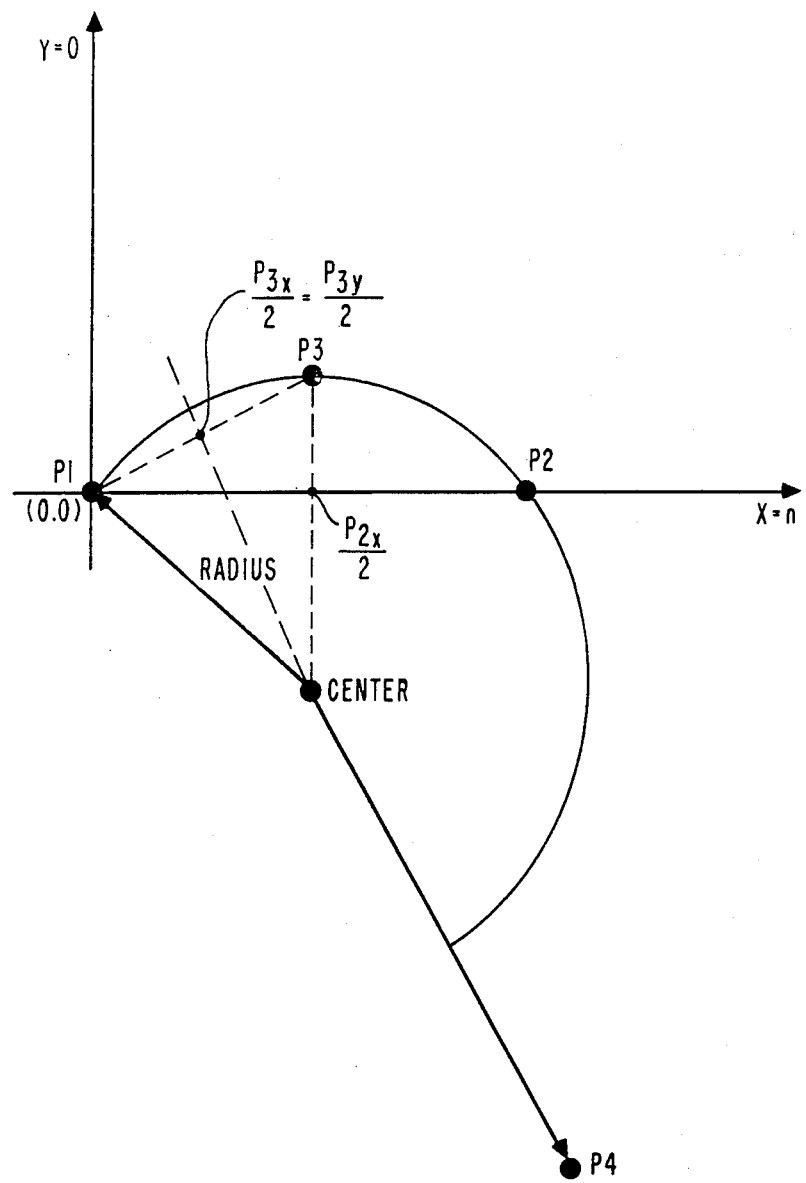

Generation of the positions along a specified circular path is achieved by defining the circular path in 2 dimensional space and then transforming the 2-D system to 3 dimensional space in World coordinates. The 2-D system is defined as shown in FIG. 9B.

Trajectory can thus generate points along the circular path as follows:

$$X = \text{Radius} * \text{Cos(ANGLE)} + X\text{Center}$$

$$Y = \text{Radius} * \text{Sin(ANGLE)} + Y\text{Center}$$

As ANGLE is varied from (Initial_Angle) to (Initial_Angle+Total_Angle). The 2-D X,Y point can then be mapped into World by the CBASE transformation.

Therefore, planning calculates the following 2-D circle characteristics:

1. Initial arc angle.
2. Total angular displacement.
3. Center of circle.
4. Radius of circle.
5. CBASE transformation.

Orientation

Orientation is interpolated by means of the "four angle" method. Thus, when the orientation is to be interpolated the initial and final orientations are obtained to calculate the data for the "four angle" method.

Local frame orientation is defined to be the separation of the world orientation into two components:

1. world/local frame (Local frame).
2. local/tool orientation. where the World orientation is thus:

$$\text{World} = \text{world/local} * \text{local/tool}$$

The local frame is defined by the path geometry and thus changes along the circular path (FIG. 9A where arrows designate direction of travel). The instantaneous local frame "o" (orientation vector) vector is defined to be the direction of the path tangent. The "n" vector (normal vector) is in the direction of the path normal which is perpendicular to the "o" vector. The "a" vector (approach vector) is defined as the cross product of the "n" and "o" vectors (n×o).

The No Wrap orientation option alters the orientation to cancel any rotation about the a vector. This result is accomplished by rotating about the a vector by an angular amount proportional to the current angle of the circle. The angle is first multiplied by a "sign" factor that is either positive, negative, or zero.

CIRCULAR PATH PLANNING

Position

The following steps are taken in planning circular path:

The transformation from World to the circle plane of Z=0 (FIG. 9B) is calculated as follows:

CBASE = FRAME(P1, P2, P3, P1)

The points defining the circle are mapped into 2-D:

P—2D = CBASE—INVERSE * P—3D where:
CBASE INVERSE is the inverse of the CBASE transformation; i.e. [CBASE] [CBASE_INVERSE]=[I]=identity matrix.
CBASE_INVERSE is calculated as follows:

$$\vec{Z} = \vec{a} \frac{(\vec{P_2} - \vec{P_1}) \times (\vec{P_3} - \vec{P_1})}{|\vec{P_2} - \vec{P_1}||\vec{P_3} - \vec{P_1}|}$$

$$\vec{X}n = \frac{(P_2 - P_1)}{|\vec{P_2} - \vec{P_1}|}$$

$\vec{y} = \vec{o} = \vec{a} = \vec{n} =$
(Note: $x_c$, $y_c$ defined)

The center of the circle is found as follows:
1. The center of the circle lies on the $X = P2.X/2$ line.
2. The center of the circle lies on the line which is both perpendicular to the line through P1 and P3, and passing through the point (P3.X/2, P3.Y/2) (FIG. 9B).

The equation for this line is thus:

$Y = -(P3.X/P3.Y)*X + (P3.Y*P3.Y + P3.X*P3.X)/(2*P3.Y)$

3. The center of the circle is the intersection of these two lines which is:

Center.X = P2.X/2

Center.Y = (P3.X − P2.X)*P3.X/(2*P3.Y) + P3.Y

The radius of the circle is found as:

Radius = SQRT(Center.X * Center.X + Center.Y * Center.Y)

The initial angle is found as:

INITIAL_ANGLE = tan-1(Center.Y, Center.X)

The final angle is found from P4:

FINAL_ANGLE = tan-1((P4.Y-Center.Y) (P4.X-Center.X))

The total angle to travel is thus:

TOTAL_ANGLE = FINAL_ANGLE − INITIAL_ANGLE

Orientation

If world frame orientation is specified then the initial orientation and the orientation of P2 are used to calculate the orientation interpolation data. If local frame orientation is specified then the local frames at the start and end of the path are calculated. The initial and final local/tool orientations are calculated and used to calculate the orientation interpolation data. If constant initial orientation is specified then data for no interpolation is used. If no wrap orientation is specified then the initial a vector is tested to determine whether it points above, below, or along the Z=0 plane of the circle.

CIRCULAR PATH TRAJECTORY

Position

The following steps are taken by trajectory to calculate points along the circular path.
The angle along the path is calculated as:

ANGLE = INITIAL_ANGLE + "S" * TOTAL_ANGLE where:
"s" is the normalized distance along the path computed by the s generator.
The 2-D position is then calculated as:

X = Radius * Cos(ANGLE) + Center.X

Y = Radius * Sin(ANGLE) + Center.Y

The 2-D position is transformed to WORLD by CBASE:

P_3D = CBASE*P_2D

Orientation

The following steps are taken by trajectory to calculate orientation along the circular path.

If world frame orientation is specified then the $R_{world}^{tool}$ orientation is found from evaluating the orientation interpolation data. If local frame orientation is specified then the $R_{local}^{tool}$ orientation is found from evaluating the orientation interpolation data.

If local frame orientation is specified then the world/local frame is calculated and the world/tool orientation is found:

$$R_{world}^{tool} = R_{world}^{local} * R_{local}^{tool}$$

where:
$R_{world}^{local}$ = orientation of local frame with respect to the world reference frame.
$R_{local}^{tool}$ = orientation of tool tip with respect to the local reference frame.
$R_{world}^{tool}$ = orientation of the tool tip with respect to the world reference frame.
If no wrap orientation is specified then a rotation is performed about the new orientation a vector by an amount of the arc angle.

CIRCULAR PATH CP

All Cartesian motion types use the same CP algorithm; a polynomial to match path segment boundary conditions at the transition points. More disclosure on these equations is set forth in U.S. Ser. No. 932,985. Thus, for Circular Path only the boundary conditions need to be calculated. The boundary conditions are:
1. X, Y, Z position—Position is calculated by evaluating the circular path at the specified transition point.
2. X, Y, Z velocity—Velocity is calculated as: Velocity = |path tangent|*slew velocity
3. Orientation—Orientation is calculated by evaluating the orientation at the specified transition point.

Figure 9C:
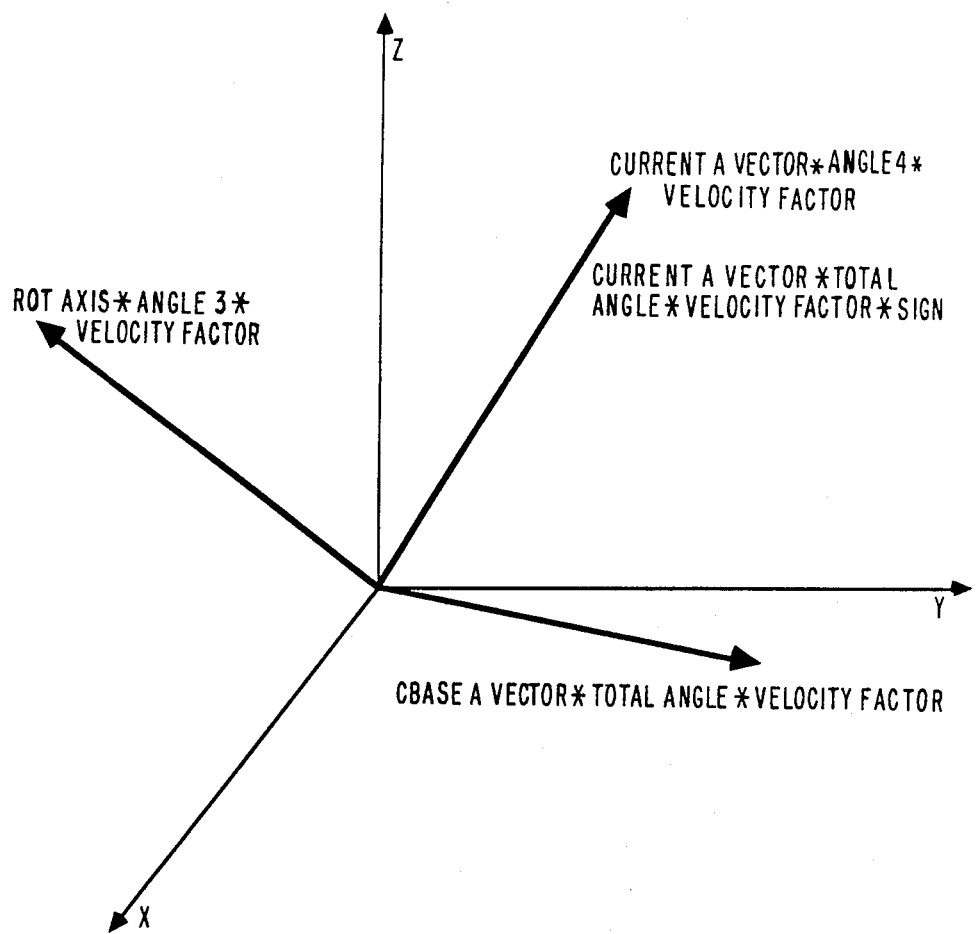

4. Orientation velocity—Orientation velocity is calculated by summing the vectors shown in FIG. 9C when they apply based upon the orientation options:

CURVED PATH—SPLINE FIT

FUNCTIONALITY

Spline path enables the UNIVAL user to specify a spline path for the robot tool tip to follow. In addition, the orientation of the tool tip is specified and can be related to the actual spline path. In this embodiment, "spline path" is defined to be a sequence of 3rd order polynomials whose boundary conditions match.

The tool tip position is simply interpolated along the specified spline path. However, the tool tip orientation along the spline path has numerous possibilities, one of which is specified by the user. The possibilities are combinations of the following choices:

1. Orientation interpolation vs. Constant orientation. In the former, the orientation is linearly interpolated between two specified orientations. In the latter, the orientation is held constant over the entire circular path.

2. World frame orientation vs. Local frame orientation. In the former, the orientation is with respect to the world reference frame. In the latter, the orientation is with respect to the local reference frame.

The length of each polynomial of the spline path is specified so the total path length can be obtained. An "S" profile is fitted to it just as for Cartesian straight line motion. Thus, the tool tip can accelerate along the path to a constant velocity and then decelerate to a stop at the end point. As spline path can be used to eliminate the need for continuous path, CP is normally not implemented.

Local frame orientation is a new orientation feature that mains a tool orientation frame relative to the Cartesian path. The frame's "o" vector is defined to be in the direction of the path tangent and the n vector is defined by the user. This allows robot operations with a path critical orientation to be performed.

SPLINE PATH OVERVIEW

Planning Data from UNIVAL

The data available for spline path planning is a sequence of 3rd order polynomial coefficients, their lengths, the initial and final world orientations, the local frame "n" vector, and two orientation switches.

Figure 9D:
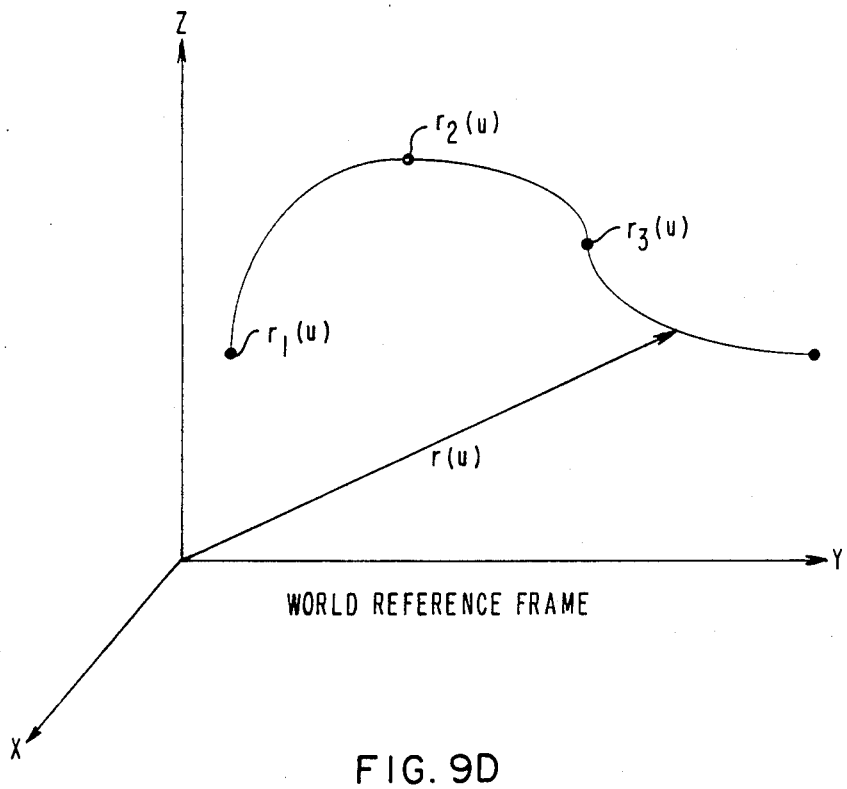

1. The polynomial coefficients, a0, a1, a2, a3, correspond to a position vector polynomial of the form:

$$r(u) = [x(u), y(u), z(u)]$$

where x(u), u(u), and z(u) are of the form:

$$a0 + a1*u + a2*u*u + a3*u*u*u$$

for u=0→1. Thus, there are three sets of polynomial coefficients for each spline section in order to define x(u), y(u), z(u). With reference to FIG. 9D, the applicable equation is:

$$r(u) = a0 + a1*u + a2*u*u + a3*u*u*u$$

2. The path segment length is the integral:

$$\int_0^1 (x(u)*xx(u) + y(u)*y(u) + z(u)*z(u))^{\frac{1}{2}} du$$

There is one length for each spline section.

3. The local frame "n" vector is used to define the local frame.

4. "INT_CON" orientation switch—specifies interpolated orientation or constant initial orientation.

5. "WOR_LOC" orientation switch—specifies either world frame orientation or local frame orientation.

POSITION

The total path length is calculated by summing the individual section lengths. The coefficients for the first spatial derivative of the path are not calculated at planning. An "S" profile is fitted to the entire path.

During trajectory the generated value for "S" cannot be used to evaluate x(u), y(u), z(u) by letting u=S. For a general polynomial, u is not proportional to the normalized path length. Thus, an algorithm to determine u for a specified S must be employed. Simply, the algorithm is:

$$du = |d/du\ r(u)|*ds$$

where "| |" is the notation for the magnitude of the enclosed vector. This equation is the finite approximation for the instantaneous equation. Thus in the limit as ds→0, the equation is exact. Since ds will not be 0, the equation will be iteratively employed to converge to the desired incremental distance (NOT path length).

ORIENTATION

Orientation is interpolated by means of the "four angle" method. Thus, when the orientation is to be interpolated the initial and final orientations are obtained to calculate the data for the "four angle" method.

Local frame orientation is defined to be the separation of the world orientation into two components:

1. $R_{world}^{local}$—orientation of local frame with respect to the world reference frame.

2. $R_{local}^{tool}$—orientation of tool tip with respect to the local reference frame.

where the tool tip orientation with respect to the world is:

$$R_{world}^{tool} = R_{world}^{local} * R_{local}^{tool}$$

The local frame is defined by the path geometry and thus changes along the spline path. The local frames "o" vector is defined to be in the direction of the path tangent. The "n" vector is specified by the user. The "a" vector is defined from (n×o). Then the "n" vector is redefined by (o×a).

SPLINE PATH PLANNING

Position

The following steps are taken in planning spline path:

The total path length is calculated by summing the individual path section lengths. An "S" profile is fitted to the path based upon the user specified maximum velocity, acceleration, and deceleration.

Orientation

The initial and final local/tool orientation is calculated if so specified. The "four angle" interpolation method data is calculated.

SPLINE PATH TRAJECTORY

Position

As "u" is not proportional to path length for the general 3rd order polynomial, a new method for varying "u" in order to achieve a desired change in path length is used. The following calculation is employed:

$$\text{"u' increment"} = \text{"s' increment"} * \frac{\text{path length}}{\text{"}|d/du\ r(u)|\text{"}}$$

Thus, trajectory can continue to calculate a desired percentage path length, 's' value. An iterative scheme is used to converge to the desired "path length difference" preferably approximated as the straight line distance in the present embodiment. Although convergence to the actual path length can be employed, it involves much greater computation cost. Since the path length is being approximated by a straight line during trajectory, the Cartesian velocity at a VAL tick (of about one millisecond as timed in incorporated by reference U.S. Ser. No. 932,976 on page 45 thereof), is precise and the path is always followed. This approximation becomes less valid as curvature increases and the step length increases relative to the section length.

The following steps are taken by trajectory to calculate points along the spline path.
1. "path increment" = "'s' increment" * path length.
2. Repeat:
   a. "u increment" = "path increment"/"$|d/du\ r(u)|$"
   b. "path increment" = "path increment" − $|r(u+u\ \text{increment}) − r(u)|$
3. $u = u + u$ increment.

Orientation

The following steps are taken by trajectory to calculate orientation along the spline path.

If world frame orientation is specified then the $R_{world}^{tool}$ orientation is found from evaluating the orientation interpolation data. If local frame orientation is specified then the $R_{local}^{tool}$ orientation is found from evaluating the orientation/interpolation data.

If local frame orientation is specified then the $R_{world}^{local}$ frame is calculated and the $R_{world}^{tool}$ orientation is found:

$$R_{world}^{tool} = R_{world}^{local} * R_{tool}^{local}$$

SPLINE PATH CP

Although CP (continuous path) for spline path is not required, it may be used. All Cartesian motion types use the same CP algorithm; a polynomial to match path segment boundary conditions at the transition points. Thus, for spline path only the boundary conditions need to be calculated. The boundary conditions are:
1. X, Y, Z position—Position is calculated by evaluating the circular path at the specified transition point.
2. X, Y, Z velocity—Velocity is calculated as:

$$\text{Velocity} = |\text{path tangent}| * \text{slew velocity}$$

3. Orientation—Orientation is calculated by evaluating the orientation at the specified transition point.
4. Orientation velocity—Orientation velocity is calculated by summing the appropriate vectors according to the orientation options:

FURTHER DESCRIPTION OF BOARD IMPLEMENTATION CIRCUITRY SERVO CONTROL BOARD

A servo control module (SCM) or board 400 (FIGS. 4 and 10A1-2) is structured in accordance with the modular architecture of the robot control system to operate as a core board for a complete basic robot control and generate arm solutions from stored robot program commands or to operate as part of an expanded robot control and receive for implementation arm solutions produced from robot program commands by the higher level system control board 350. The generation of arm solutions involves the execution of robot control functions including robot program language interpretation, path planning, trajectory calculations (intermediate position commands and axis coordination) and transformation of position information between Cartesian and robot joint and robot tool coordinate systems. The SCM board 400 additionally provides communications interfacing with related peripherals and a host controller if provided.

The SCM board 400 is provided with program controlled digital circuitry to implement arm motion control loops for the robot control system. Motion control is achieved for each axis through a control loop arrangement which preferably includes interrelated position, velocity, and acceleration control loops from which torque commands are developed for implementation by the torque processor module 600. The digital servo control is a coordinated multiprocessor servo control that generates output torque commands from (1) position and velocity commands provided for each axis by the arm solution and (2) position and velocity feedback signals obtained from the position encoders and the tachometers through the arm interface module 800.

In the SCM control loop operation, a position error is calculated for each axis from the applied axis position command and the axis position feedback. A velocity error is calculated for each axis from a velocity command derived from successive position commands and from the axis velocity feedback. Preferably, the position and velocity control loops are operated in parallel, i.e., the position and velocity errors are summed to produce a torque command for the torque control loop on the torque control module 600. Additionally, an acceleration command preferably is derived from successive velocity commands and applied in a feedforward acceleration control loop which generates an acceleration based torque command for summation with the position and velocity errors in generating the SCM output torque command.

The frequency with which loop calculations are made is selected to produce robot arm motion which is fast, accurate, smooth and stable. For example, the frequency employed can be such as to provide a trajectory cycle of 32 milliseconds as in the present case. If desired, a faster trajectory cycle, i.e., as short as 8 milliseconds, can be achieved.

SCM DIGITAL CIRCUITRY

Figures 1, 10A:
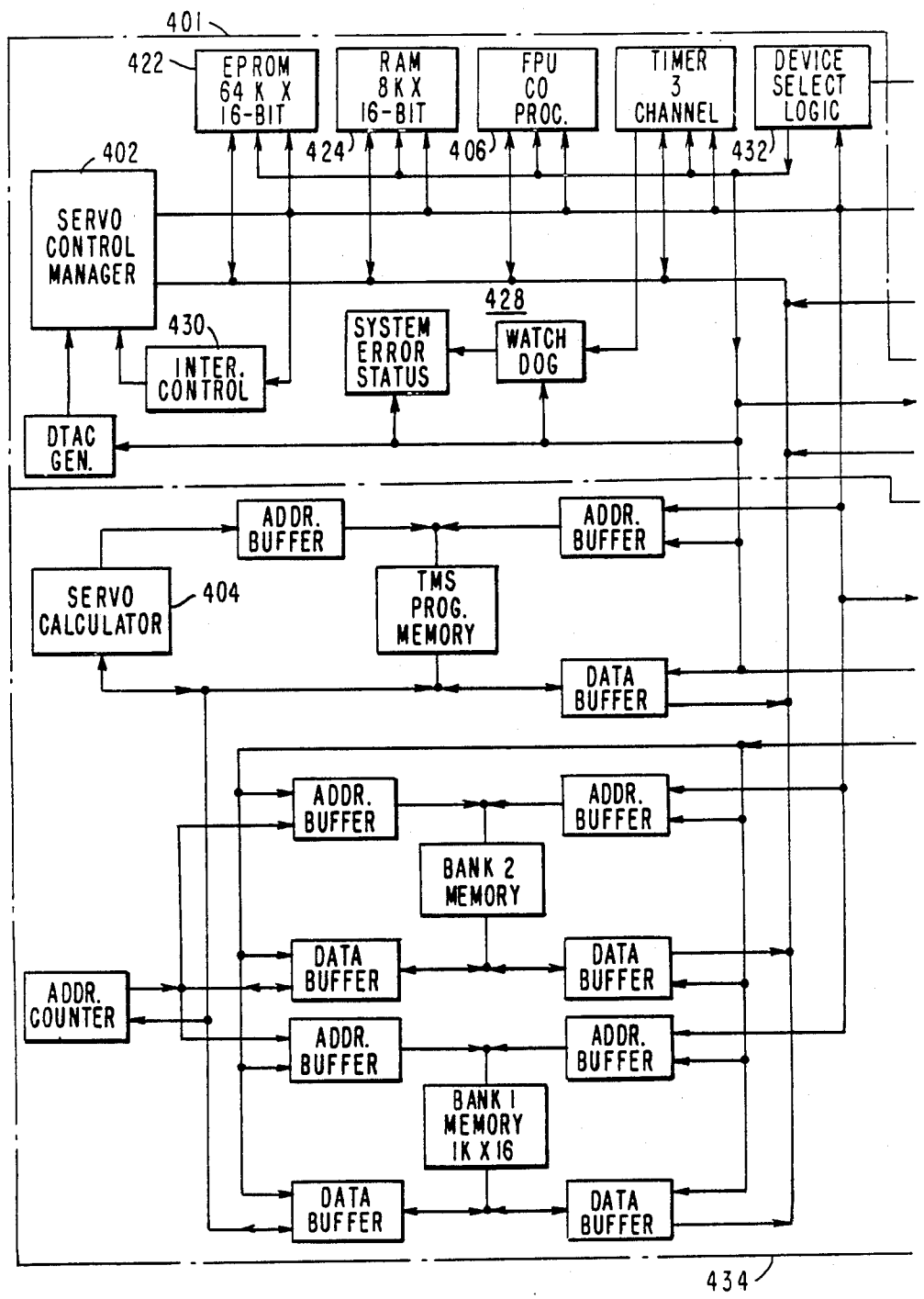
Figures 2, 10A:
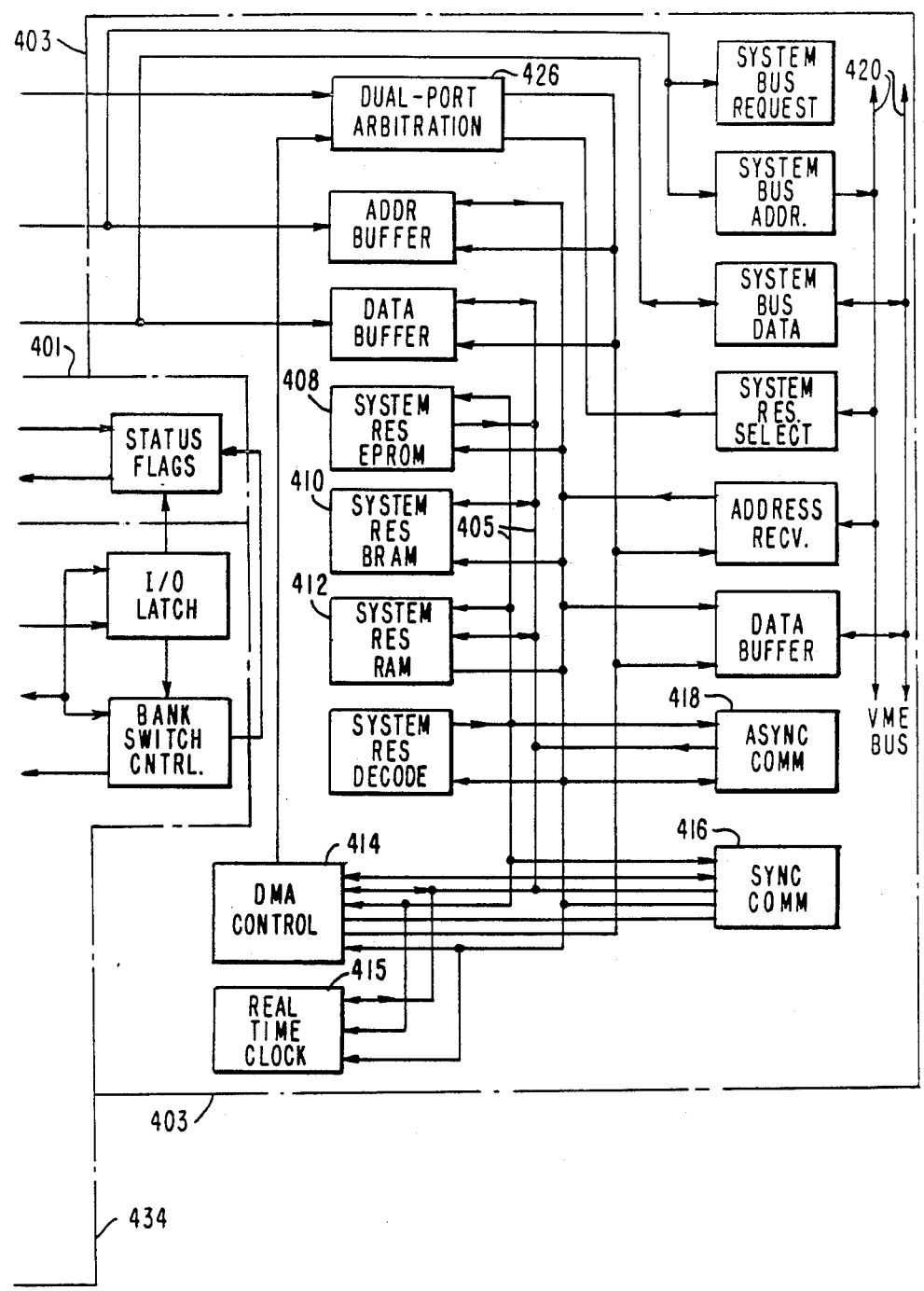
Figures 1, 11A:
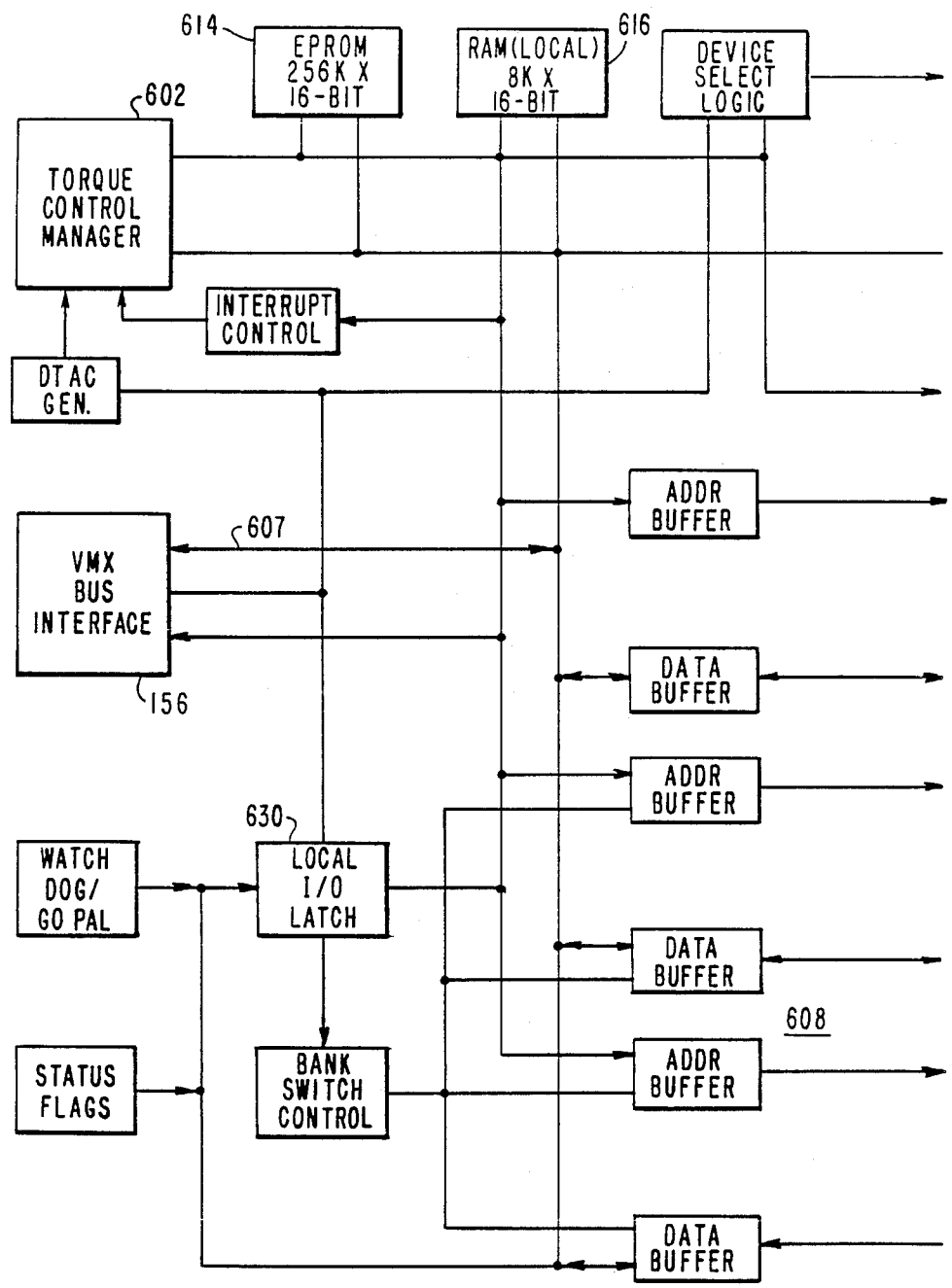
Figures 2, 11A:
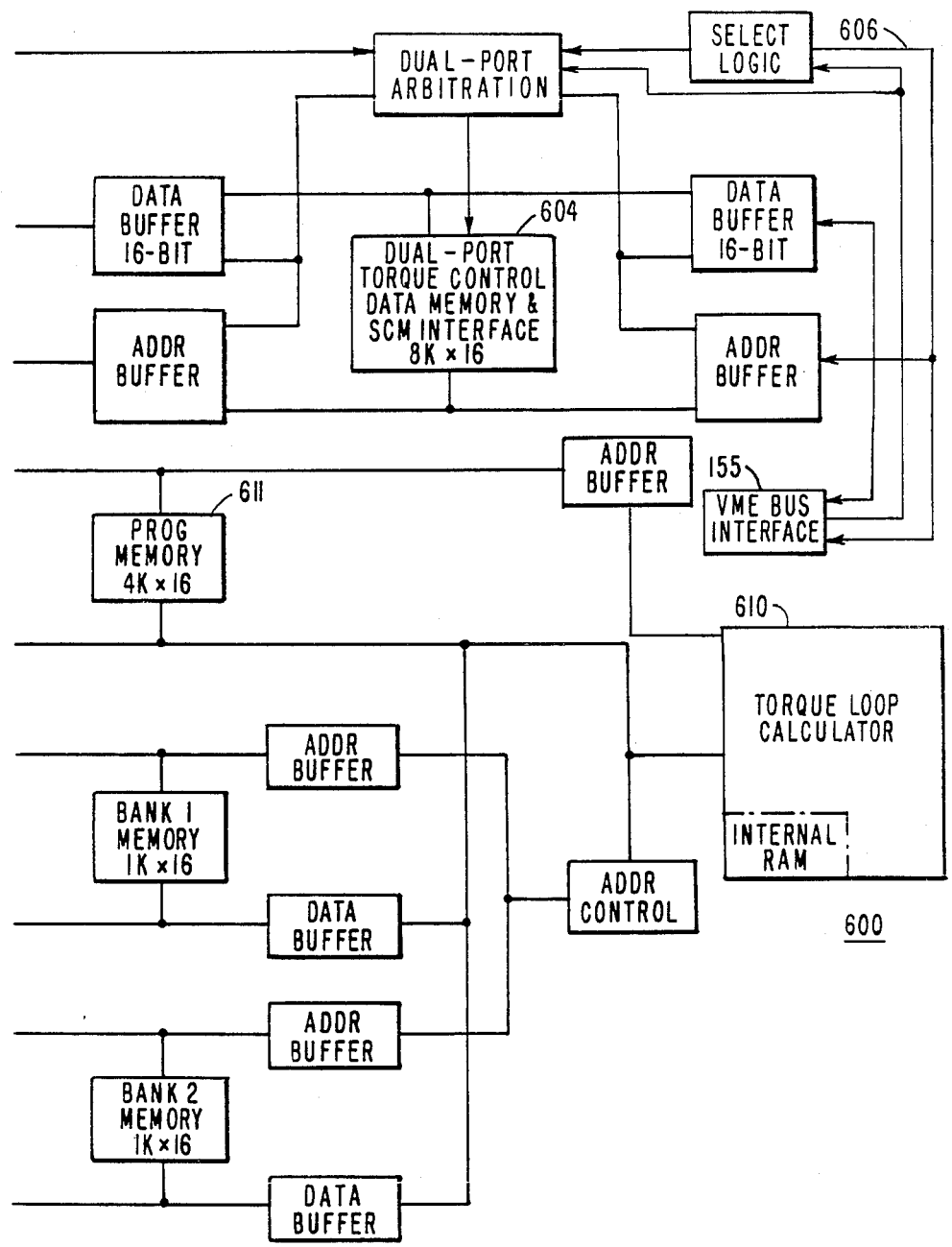

As observed in FIGS. 10A1-2, the SCM board 400 generally comprises two sections, i.e., a local processor section 401 and a system resource section 403. The system resource section 403 employs a bus 405 and provides functions related to the overall robot control system and not specifically related to execution of the position and velocity control loops.

These functions include EPROM 408 for storage of the robot arm solutions, battery backed-up RAM 410 for storage of non-volatile data, static RAM 412, real-time clock 415, a DMA controller 414 and two muli-protocol, dual channel communications controllers 416 and 418.

The system resource area is implemented as dual-port memory. As such, equal access to the system resource section is provided from either a local processor 401 or from the VME bus 420. The system resource functions appear as a bus slave to the VME bus. This provides the capability for these related functions to be controlled either from the SCM local processor, or from an optional processor connected to the system bus.

In the local processor section 401, the SCM digital circuitry includes coordinated digital coprocessors and interface and resource circuitry needed for specified performance, i.e., to provide control calculations and control data management needed for accurate and efficient control of all axes and to provide interfacing communication with a host controller, peripheral devices and other robot controllers. Preferably, a servo control manager 402 operates with a servo calculator 404 which functions as a slave processor principally to make position and velocity control loop calculations (i.e., feedback filters, loop gains, position and velocity errors, etc.).

The servo control manager 402 directs control, status and program data to and from the SCM board 400 and to and from the servo position/velocity control calculator 404. The servo control manager 402 can be a Motorola 68000 which has a high data processing capability. By separating data management and control calculation tasks in accordance with the respective capabilities of the processors 402 and 404, a basic circuit organization is provided as a basis for achieving substantially improved control performance with manufacturing and user economy.

In the illustrated embodiment, implementation of the local processor section of the SCM board 400 is based on usage of a 68000 processor as the servo control manager 402 and two coprocessors. Both coprocessors serve as peripheral devices to the 68000. One of the coprocessors 406 (preferably National Semiconductor 32081), provides floating-point calculation capability when arm solutions are to be provided by the SCM board 400. The other coprocessor, or slave processor, is the position/velocity servo calculator 404 and is implemented with a Texas Instruments TMS-32010 Digital Signal Processor. The position/velocity processor provides high speed fixed point calculation capability.

The remaining functions which are a part of the local processor section include local memory, both EPROM 422 and RAM 424, a peripheral timer/counter device, interrupt control 430, and system error monitoring devices 428. The local processor 402 can serve as a master to the VME bus for access to the TPM or other related type functions. However, the SCM board 400 does not provide VME bus system controller type functions which normally include system reset generation, bus arbitration for access to the bus and system bus clock generation, since these functions are implemented on the arm interface board 800.

The SCM board 400 is arranged to provide as much systems flexibility as is reasonably possible, and to obtain the maximum performance from available large scale integrated (LSI) circuitry. This is one of the reasons that the DMA and communications facilities are implemented in the system resource area as opposed to being directly connected to the local processor bus. This architecture not only frees the servo control manager 400 from direct intervention in communications data movement, it also eliminates the local processor bus communications related overhead, thus allowing high speed serial communications to be conducted without significant impact on program execution time in the servo control manager 400. Also, by placing these functions in the system resource area, these facilities can be operated by any other optional processor with capability of serving as a VME bus master. This would then totally free the servo control manager 400 from communications related processing. This organization allows the complete functionality required for a robot control system to be implemented in a cost effective manner and on a minimal set of boards while also allowing increased performance controllers to be implemented without impacting the overall system design.

Another significant area is the interface between the servo control manager 402 and the servo calculator 404. Here, a special dual port memory organization, referred to as "ping-pong" or "bank switched" memory allows either processor to communicate with the other without impacting the processing performance of either processor.

PROGRAMMED OPERATION OF SERVO CONTROL BOARD

The program system for the servo control data manager 402 of FIG. 10A-1 comprises a background program called MAIN and a cyclically operated foreground interrupt routine called SERVO, as seen in greater detail in FIGS. 7B, 7C and 7D of incorporated by reference U.S. Ser. No. 932,990. When the system is started by RESET, an initialization routine is executed prior to continuous running of the MAIN program. In addition to a cyclically executed SERVO interrupt, an interrupt routine called C&UNEX operates in the foreground on demand to process unscheduled or unexpected interrupts. Further, a special highest priority routine called the watch dog timer interrupt functions in response to operation of the external watch dog hardware.

Where the robot control system includes the system control board 500 in FIG. 4 for expanded performance through higher computing capacity, the MAIN program provides for receiving and distributing position commands from the system control board 500. In the minimum or basic robot control system configuration, the system control board 500 is not included and the MAIN program further controls the calculations of arm solutions to generate position commands locally on the servo control board 400. Additional description on the SCM programming and the minimum robot control is presented in U.S. Ser. No. 932,991.

The rate at which the MAIN program is interrupted for the cyclical execution of the SERVO routine is controlled by the signal VTICK generated once each millisecond on the VME bus 155 from the arm interface board 800. The basic functions provided by the SERVO routine are:

(1) transfer control data to and from the servo calculator 404;

(2) tranfer control data to and from the torque processor board 600;

(3) receive sensor feedback data over the VME bus 155 from the arm interface board 800;

(4) interface to the supporting background task RDMASC (in FIG. 7D of U.S. Ser. No. 932,990);

(5) perform synchronous data logging;

(6) perform one shot data logging;

(7) place broadcast data in a blackboard storage area;

(8) shut the system down if serious error conditions occur.

In the servo calculator 402, two basic functions are performed. First, downloaded position command data is interpolated for each of the 31 ticks between long ticks in the VALCYCLE, and velocity and acceleration command data are computed from the position command data for each tick. Next, servo calculations are made for each axis after each tick for the position, velocity and acceleration commands then applicable and the concurrently received position and velocity feedback. As a result, a torque command is computed for each axis after every tick for execution by the torque processor board.

The control algorithms executed by the servo calculator 404 are described in greater detail in Ser. No. 932,990.

TORQUE PROCESSOR BOARD CONCEPTS

The torque processor (TP) board 600 provides a functional interface to the robot joint drive motors. Functionally, the TP board 600 implements the lowest level of control in the hierarchical control system, providing closed loop servo torque control for six robot axes. Physically, the TP board 600 electrically interfaces the robot path planning control system and the servo control (SCM) board with the arm interface (AIF) board 800, which in turn interfaces to the robot joint drive motors. The primary function of the TP board 600 is to regulate robot joint motor currents to commanded values by generating motor winding voltage commands which are executed using a pulse width modulation scheme on the AIF board.

The TP board 600 interfaces at one level to the SCM board, accepts from the SCM board torque commands and servo parameters for six axes and returns status data. The TP board 600 interfaces at a second lower level to the AIF board 800 providing servo voltage commands for the six robot axes. The AIF board 800 receives drive motor current, position and velocity feedback for closed loop control on the SCM and TP boards.

The TP board 600 employs the paired microprocessor to provide a number of features including the following:

1. Torque loop control for six axes (250 micro sec per 6 axes) for brush and brushless motors;
2. Software adjustable current offset—eliminates potentiometers;
3. Downloadable gains—arm dependent parameters can be downloaded from the SCM board;
4. PWM compensation;
5. Commutation compensation;
6. Current averaging for data logging and other purposes;
7. Current limit check;
8. Velocity monitoring (back emf) for safety check;
9. Energy check (IIT) to test stall condition;
10. Power-up self diagnostics; and
11. Downloadable diagnostics system.

TORQUE PROCESSOR BOARD

More advanced robot performance is produced by digitally controlling the torque applied at the arm workpoint when the arm is in motion to control the arm workpoint position in accordance with a command trajectory. Axis drive forces are adjusted in accordance with actually experienced workpiece loading to satisfy position and trajectory commands with greater speed, accuracy and efficiency. Reference is made to U.S. Ser. No. 932,974 for a related invention directed to the control of torque as an end controlled variable.

The torque control is embodied on a generic control circuit board 600 (FIGS. 4 and 11A-1 and 11A-2) called a torque processor (TP) board i.e., an electronic board usable to provide torque control for a wide variety of robots having different load capacities, different types of drives, different numbers of axes, etc.

The torque processor board 600 employs digital circuitry to generate voltage commands for each joint motor or axis drive on the basis of torque commands obtained from a higher control level (SCM board) and feedback currents obtained through the arm interface (AIF) board 800 from the axis drives. Thus, the torque control loops for all of the joint motors are closed through the TP board circuitry.

In the case of electric drives, the feedback current is the motor winding current which is proportional to actual motor torque. For hydraulic drives, the feedback signal is also proportional to actual motor torque.

The digital torque control circuitry is preferably structured with multiple digital processors so that needed control computation and control support functions can be achieved for all axes accurately and efficiently within sampling frequency requirements.

In particular, a torque control manager 602 interfaces with a dual port SCM interface memory 604 for the exchange of stored torque control data between the SCM (servo control module) and the TP (torque processor) control levels. Axis torque commands and control loop parameters are downloaded from the SCM to the TP interface memory 604 through a data bus 606 preferably of the VME type. In return, status data is uploaded to the servo control level (SCM). The memory interface 604 between the TP and SCM board is a dual port shared memory scheme which serves as a slave to the VME bus 606. Other board memories include a ping-pong memory 608, program EPROM, local RAM, and TP calculator memory.

The torque control manager 602 also directs the flow of current feedback from circuitry on the AIF board 800 at the next lower control level to the torque processor board 600 for torque control loop operation. Drive voltage commands resulting from torque control calculations are directed to the arm interface (AIF) board 800 by the torque control manager 602. The ping-pong (bank switched) memory 608 operates under the control of handshake flags to store command, feedack, and status data so that it is available when needed for torque control calculations or for higher control level reporting requirements or for axis drive control.

A coprocessor 610 provided in the form of a digital signal processor operates as a torque loop calculator which receives torque commands and feedback currents from the torque control manager 602 through the ping-pong memory 608, calculates drive voltage commands for the varius robot axes from the torque errors computed from the torque commands and feedback currents, and transfers the drive voltage commands through the ping-pong memory 608 to the arm interface circuitry on command from the torque control manager 608.

With the described digital circuit structure, all needed torque control functions are able to be performed rapidly (250 microsecond sampling rate or better) and accurately within frequency response requirements. Sepcifically, the rapid calculating capability of the digital signal processor 610 is employed for the torque control calculations as the data organizing and directing capability of the torque control manager 602 is employed for most other functions thereby enabling highly improved control performance to be achieved efficiently and economically.

The torque control manager 602 has an architecture well suited for the tasks described for data management but which has a calculating speed (i.e., over 4 microseconds for a 16×16 bit multiplication) too limited to meet torque control bandwidth requirements. The digital signal processor 610 has an architecture set for Z transform calculations (i.e., a calculating speed of 200 nanoseconds for a 16×16 bit multiplication) but which is otherwise generally unsuitable for the kinds of tasks assigned to the data manager processor 602. These two microprocessors function together as a unit or, in other terms, as a servo engine.

For more detail on the torque board circuitry, reference is made to U.S. Ser. No. 932,977 or U.S. Ser. No. 932,992.

TORQUE CONTROL PROGRAMMING

The torque processor board 600 is operated under the control of programs executed in the on board processors 602 and 610 to implement torque command signals from the higher SCM control level.

The torque processor software generally performs the following tasks which are partitioned as indicated:

Torque Control Manager 602

Communication with SCM
Command handling
Current sampling, conversion and offset adjustment
Commutation switch flag (state reading)
Ping-pong memory management
PWM chip management
Diagnostics
Error reporting

Torque Loop Calculator 610

(program cycling based on 250 microsecond interrupt)

Overcurrent check—absolute and average
Torque loop calculations
Current averaging
PWM compensation
Commutation compensation
Back emf check—monitors velocity for safety
Energy check—tests for stall conditions Reference is made to Ser. No. 932,976 for more detail on TP software structure and operation.

ARM DRIVE CONTROL

Figure 12:
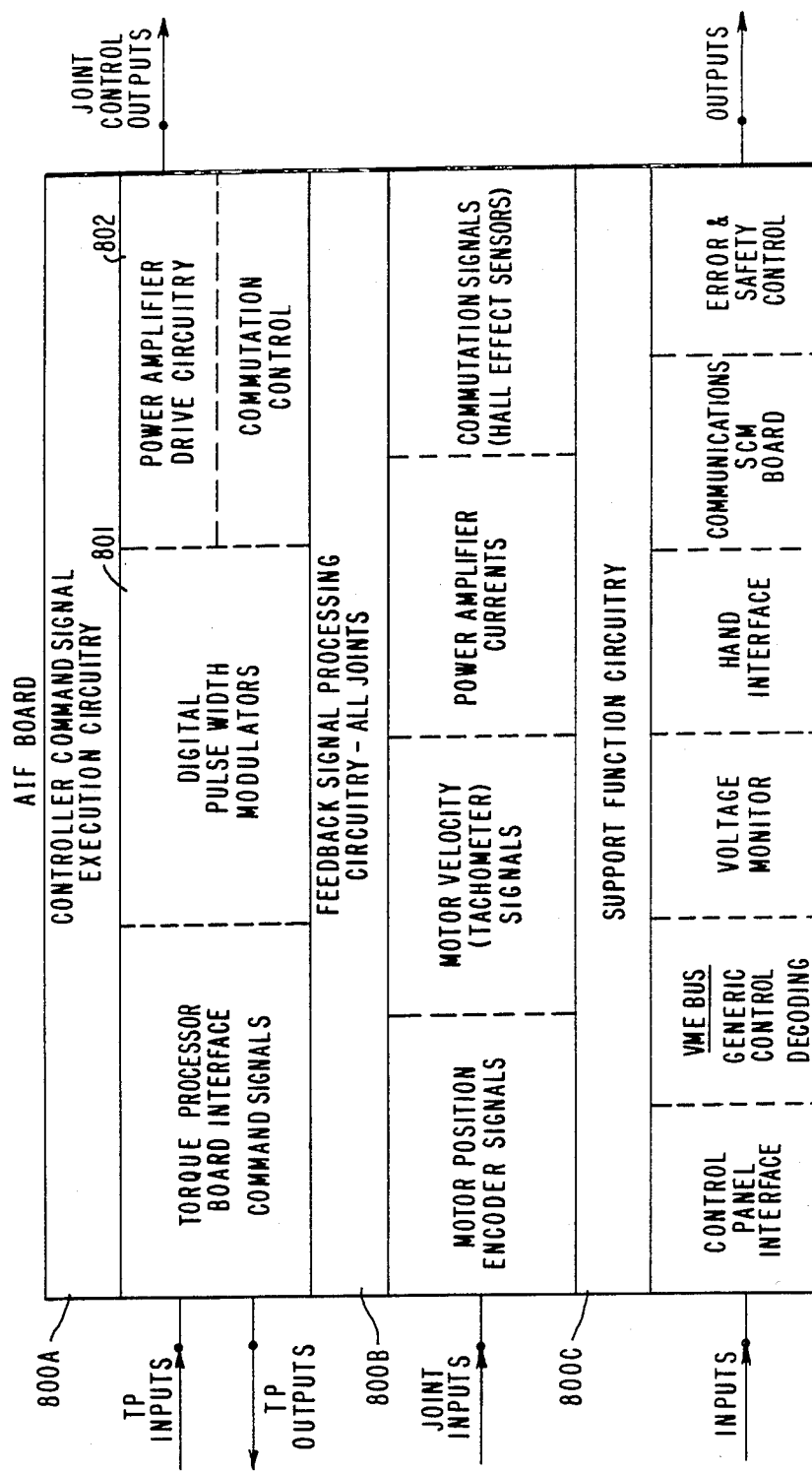

As now further described with reference to FIG. 12, the higher level control looping generates voltage command signals to be excuted through the AIF board 800 (FIG. 12) for the arm axes so that the arm effector is moved to commanded positions under controlled velocity, acceleration and torue in accordance with a user's robot program. Pulse width modulation circuitry 801 and drive circuitry 802 are provided on the AIF board 800 to develop axis drive signals, in this instance for application to power amplifiers which provide the drive currents to DC brushless electric motors repsectively associated with the six axes of arm motion.

The AIF board circuitry processes the voltage command data to develop digital TTL logic level signals to control the base or gate drive circuitry of the power amplifiers which supply the motor drive currents to the axis motors. As previously indicated, the motor currents and axis position and velocity data are fed back through the AIF board 800 to the higher level control loops for closed loop position, velocity and torque control.

AIF BOARD-PULSE WIDTH MODULATION SCHEME

The pulse width modulation circuitry 801 on the AIF board 800 provides a digital interface for closing the torque or current control loop through the axis motor drive circuitry. The pulse width modulation concept is applied to control the conduction time width for the joint motor power switches and thereby satisfying motor voltage and torque commands.

Figure 15:
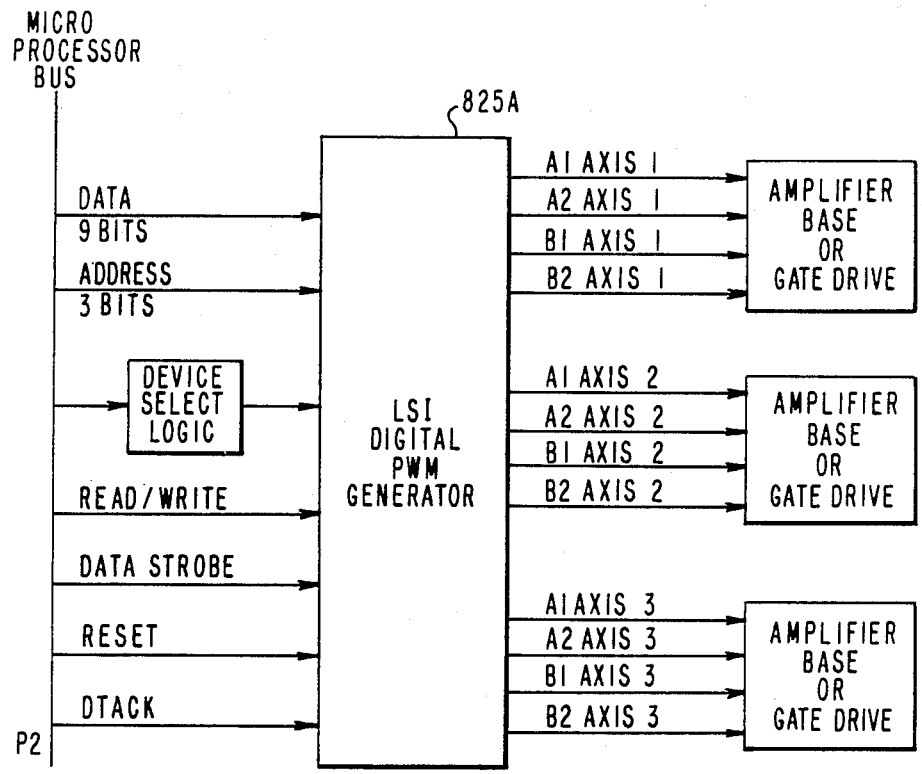
FIG. 15 shows a block diagram of a PWM circuit used on the AlF board to generate control signals for the joint motors.

As shown in the generalized block diagram of FIG. 15, a digital PWM generator 825A receives 9 bit data commands and 3 register address bits on the torque microprocessor P2 bus. Additionally, device select logic, read/write, reset (initialization) and data strobe signals are received from the P2 bus. A DTACK (acknowledge) signal is returned to the bus by the PWM generator 825A after each reception from the torque calculator on the torque processor board.

The digital PWM generator 825A is preferably arranged to service three axes where, for example, either brushless or brush type DC motors are employed as the axis drives. Thus, a set of digital signals (in this instance four such signals A1, A2, B1, B2) is generated for controlling the amplifier base or gate drive circuitry associated with each axis motor whether the motor is the brushless type or the DC brush type.

Figure 13A:
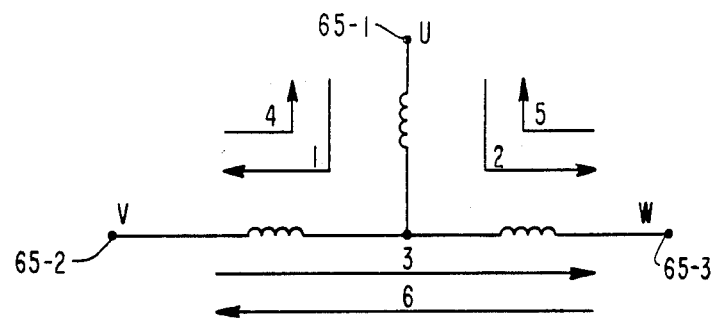
Figure 13B:
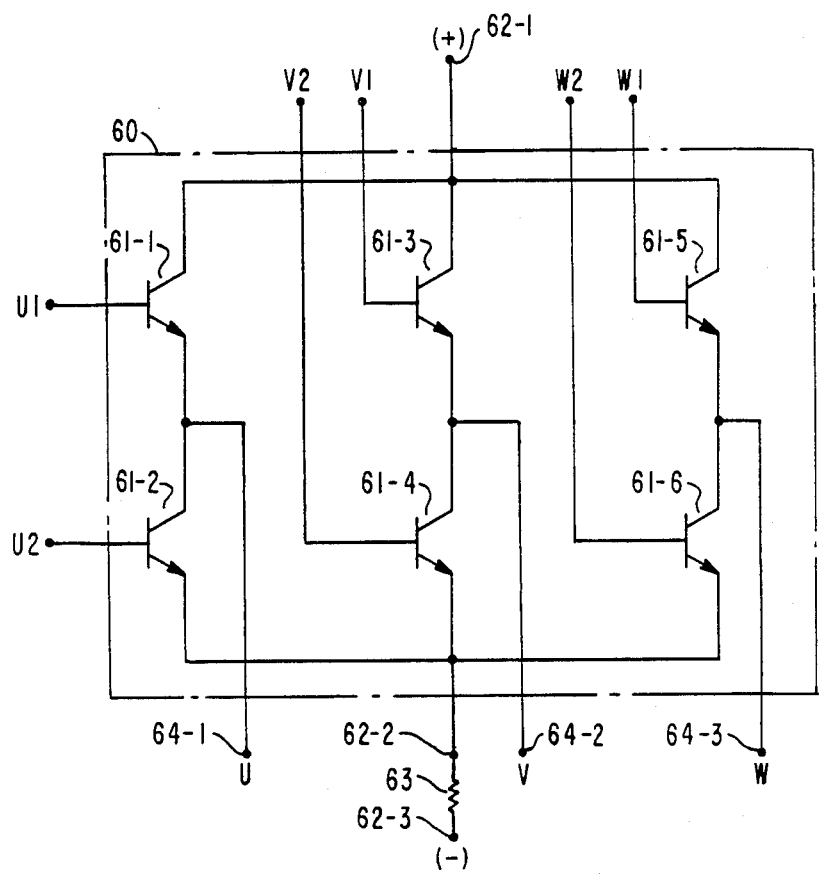

Four digital PWM control signals are employed to control the direction and magnitude of current flow through the motor windings through on/off power switch control. In the brushless DC motor embodiment, the three phase windings of the brushless DC motor are interconnected in a bridge circuit (FIGS. 13A–B) such that the motor drive current is always directed through a pair of windings and the motor conduction path is rotated or commutated through successive winding paths to produce the motor drive torque. In this arrangement, the PWM pulses determine the time span of motor current flow and commutation switching logic based on the PWM pulses and Hall effect sensor feedback signals determine the winding pairs though which, and the direction in which, drive current is to flow.

Figure 14:
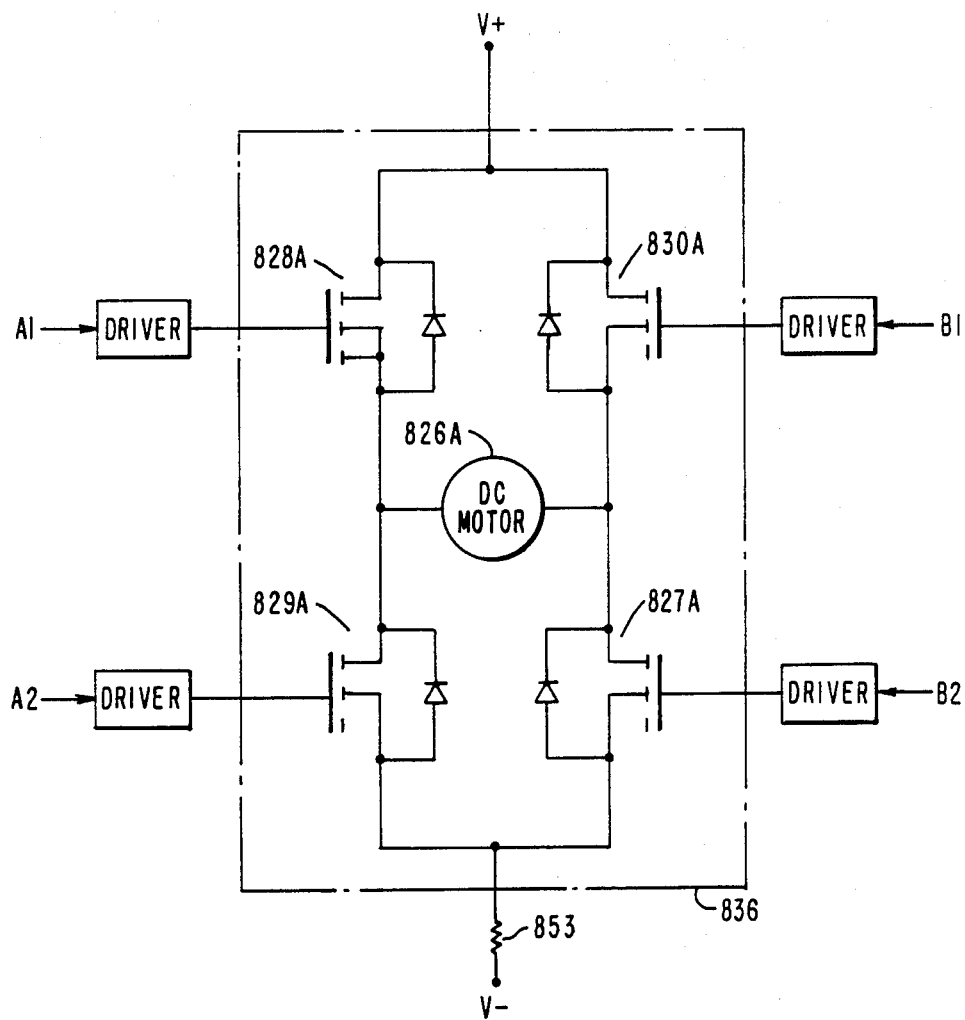

In the DC brush type embodiment where an H type power amplifier bridge circuit is employed, DC brush type motor 826A (FIG. 14) is operated in one direction when power amplifier switches 827A and 828A are opened under control of PWM output signals A1 and B2, and it is operated in the opposite direction when power amplifier switches 829A and 830A are opened under control of PWM output signals B1 and A2.

The pulse width modulation circuitry is preferably embodied in a pair of large scale integrated pulse width modulation (PWM) chips. Generally, each PWM chip operates as a microprocessor peripheral device (i.e., under the control of a microprocessor higher in the control loop configuration) to provide digital pulse width modulated signal generation for control of three axes having DC brush type motor drives.

For more detail on motor current, position and velocity feedback and other AIF board circuitry reference is made to U.S. Ser. No. 932,982. For more detail on the PWM scheme reference is made to U.S. Ser. No. 932,841.

What is claimed is:

1. A digital control for a robot having a plurality of arm joints, said control comprising:
    an electric motor for driving each of the robot arm joints;
    a power amplifier operable to supply drive current to each motor;
    feedback control loop means for each joint motor including at least digital position, velocity and torque control looops operable at a predetermined sampling rate to control the associated power amplifier;
    means for generating digital motor position, velocity and drive current feedback signals for said control loop means for all of the robot axes;
    digital control means for generating position commands for said feedback control loop means in accordance with predefined moves set forth in a robot program;
    said position command generating means including planning program means having means for generating a time profile including acceleration, slew and deceleration time segments for each commanded robot program move;
    said position command generating means further including trajectory program means for generating position commands for each of said feedback control loop means in accordance with a curved path trajectory and in accordance with the time profile applicable to the current move segment;
    said trajectory program generating means including stored curve defining equations each having predetermined variable parameters operative to particularize that equation to a commanded curved path segment;
    said trajectory program generating means further having means for responding to parameters specified by the robot program and for implementing the stored equations corresponding to the specified parameters to generate said position commands and define a tool tip trajectory corresponding to the curved path defined by the robot program.

2. A robot control as set forth in claim 1 wherein said equations include a polynomial equation having an order above one and the specified parameters include coefficients specified for the polynomial equation to fit it to the commanded curved path.

3. A robot control as set forth in claim 2 wherein said polynomial equation has an order above two.

4. A robot control as set forth in claim 2 wherein said polynomial equation has an order of three.

5. A robot control as set forth in claim 2 wherein said equations include an arc equation and the specified parameters include at least two points on the commanded arc path to fit the arc equation to it.

6. A robot control as set forth in claim 5 wherein said polynomial equation has an order above two.

7. A robot control as set forth in claim 2 wherein means are provided for responding to tool orientation commands from the robot program to control the tool orientation as the tool is moved through its curved path trajectory.

8. A robot control as set forth in claim 5 wherein a position/velocity microprocessor servo means is provided for operating the position/velocity control loops and for executing said planning and trajectory program means to generate said position commands for the position/velocity control loops.

9. A robot control as set forth in claim 8 wherein said microprocessor servo means includes calculating microprocessor means and a data processing microprocessor, and means for coupling said data processing microprocessor and said calculating microprocessor means so as to enable said data processing microprocessor to manage the flow of input/output data to and from said calculating microprocessor means during execution of said planning and trajectory program means and during execution of position/velocity control loop programming.

10. A robot control as set forth in claim 9 wherein torque microprocessor servo means is provided for operating the torque control loops.

11. A robot control as set forth in claim 5 wherein said planning and trajectory means includes continuous path program means for smoothing the command trajectory between curved path segments.

12. A robot control as set forth in claim 5 wherein a position/velocity microprocessor servo means is provided for operating the position and velocity control loops and system microprocessor means are provided for executing said planning and trajectory program means, said microprocessor servo means including a calculating microprocessor for executing position/velocity control calculations and further including a data processing microprocessor, and means for coupling said data processing microprocessor and said calculating microprocessor to enable said data processing microprocessor to manage the flow of input/output data to and from said calculating microprocessor.

13. A robot comprising:
    an arm having a plurality of joints;
    each of said joints having an electric motor drive;
    a power amplifier operable to supply drive current to each motor;
    feedback control loop means for each joint motor including at least digital position, velocity and torque control loops operable at a predetermined sampling rate to control the associated power amplifier;
    means for generating digital motor position, velocity and drive current feedback signals for said control loop means for all of the robot axes;
    digital control means for generating position commands for said feedback control loop means in accordance with predefined moves set forth in a robot program;

said position command generating means including planning program means having means for generating a time profile including acceleration, slew and deceleration time segments for each commanded robot program move;

said position command generating means further including trajectory program means for generating position commands for each of said feedback control loop means in accordance with a curved trajectory and in accordance with the time profile applicable to the current move segment;

said trajectory program generating means including stored curve defining equations each having predetermined variable parameters operative to particularize that equation to a commanded curved path segment;

said trajectory program generating means further having means for responding to parameters specified by the robot program and for implementing the stored equations corresponding to the specified parameters to generate said position commands and define a tool tip trajectory corresponding to the curved path defined by the robot program.

14. A robot as set forth in claim 13 wherein said equations include a polynomial equation having an order above one and the specified parameters include coefficients specified for the polynomial equation to fit it to the commanded curved path.

15. A robot as set forth in claim 14 wherein said equations include an arc equation and the specified parameters include at least two points on the commanded arc path to fit the arc equation to it.

16. A robot as set forth in claim 15 wherein said polynomial equation has an order above two.

17. A robot as set forth in claim 15 wherein a position/velocity microprocessor servo means is provided for operating the position/velocity control loops and for executing said planning and trajectory program means to generate said position commands for the position/velocity control loops.

* * * * *